United States Patent
King

(10) Patent No.: US 10,288,483 B2
(45) Date of Patent: May 14, 2019

(54) RECOVERING SPECTRAL SHAPE FROM SPATIAL OUTPUT

(71) Applicant: Cymer, LLC, San Diego, CA (US)

(72) Inventor: Brian Edward King, San Diego, CA (US)

(73) Assignee: Cymer, LLC, San Diego, CA (US)

(*) Notice: Subject to any disclaimer, the term of this patent is extended or adjusted under 35 U.S.C. 154(b) by 8 days.

(21) Appl. No.: 15/651,935

(22) Filed: Jul. 17, 2017

(65) Prior Publication Data

US 2018/0292263 A1 Oct. 11, 2018

Related U.S. Application Data

(60) Provisional application No. 62/483,423, filed on Apr. 9, 2017.

(51) Int. Cl.
  *G01B 9/02* (2006.01)
  *G01J 3/45* (2006.01)
  *G01J 3/26* (2006.01)

(52) U.S. Cl.
  CPC .. *G01J 3/45* (2013.01); *G01J 3/26* (2013.01)

(58) Field of Classification Search
  CPC ... G01J 3/45; G01J 3/26; G01J 9/0246; G02B 5/284; G02B 6/26358
  USPC ........................................... 356/454
  See application file for complete search history.

(56) References Cited

U.S. PATENT DOCUMENTS

| | | | |
|---|---|---|---|
| 5,760,910 A | 6/1998 | Lepper, Jr. et al. | |
| 6,603,549 B2 | 8/2003 | Haas et al. | |
| 7,256,893 B2 | 8/2007 | Rafac | |
| 7,317,536 B2 | 1/2008 | Rafac | |
| 7,639,364 B2 | 12/2009 | Rafac | |

(Continued)

FOREIGN PATENT DOCUMENTS

| | | |
|---|---|---|
| TW | I470204 B | 1/2015 |
| WO | 2005001523 A2 | 1/2005 |
| WO | 2005033626 A1 | 4/2005 |

OTHER PUBLICATIONS

Peter A. Jansson, "Deconvolution of Images and Spectra," Second Edition, Chapters 3 (pp. 76-106), 7 (pp. 236-263), and 9 (pp. 284-309), 45 total pages, Jun. 2012, Dover Publications, ISBN 9780486294452.

(Continued)

*Primary Examiner* — Tarifur R Chowdhury
*Assistant Examiner* — Jonathon Cook
(74) *Attorney, Agent, or Firm* — DiBerardino McGovern IP Group LLC

(57) ABSTRACT

A method is performed for estimating the optical spectrum of a light beam. The method includes: projecting the light beam onto distinct spatial areas of a spectrometer, wherein each spatial area receives a different filtered version of the optical spectrum; detecting a characteristic of the projected light beam at each of the distinct spatial areas of the spectrometer; receiving a two-dimensional matrix in which each entry of the matrix provides a relationship between one or more spatial areas and each spectral feature, wherein the two-dimensional matrix is related to the input-output relationship of the spectrometer; and estimating the optical spectrum of the light beam based on an analysis that uses both the detected light beam characteristics and the received two-dimensional matrix.

28 Claims, 10 Drawing Sheets

(56) References Cited

U.S. PATENT DOCUMENTS

| | | | |
|---|---|---|---|
| 7,684,046 | B2 | 3/2010 | Rafac |
| 8,542,359 | B2 | 9/2013 | Choi et al. |
| 2002/0048288 | A1* | 4/2002 | Kroyan ............... G03F 7/70025 372/20 |
| 2011/0049340 | A1 | 3/2011 | Tisserand et al. |
| 2012/0123581 | A1 | 5/2012 | Smilde et al. |
| 2014/0022544 | A1 | 1/2014 | Kurokawa et al. |
| 2016/0341602 | A1 | 11/2016 | Thornes |
| 2017/0074640 | A1* | 3/2017 | Cable ................ G01B 9/02083 |

OTHER PUBLICATIONS

Robert J. Rafac, "Overcoming limitations of etalon spectrometers used for spectral metrology of DUV excimer light sources," Proc. SPIE 5377, Optical Microlithography XVII, 846, 13 total pages, Feb. 2004.

Wikipedia, The Free Encyclopedia, "Deconvolution," Feb. 2017, retrieved Jul. 2017 from https://en.wikipedia.org/w/index.php?title=Deconvolution&oldid=763328904, 4 total pages.

Kalman, "A Singularly Valuable Decomposition: The SVD of a Matrix," The College Mathematics Journal 27 (1996), pp. 1-27.

Blaine R. Copenheaver, U.S. International Searching Authority, International Search Report and Written Opinion, counterpart PCT Application No. PCT/US2018/025738, dated Jun. 25, 2018, 11 pages total.

Office Action, counterpart Taiwanese Patent Application No. 107111739, dated Dec. 6, 2018, 14 pages total (including English translation of 6 pages).

\* cited by examiner

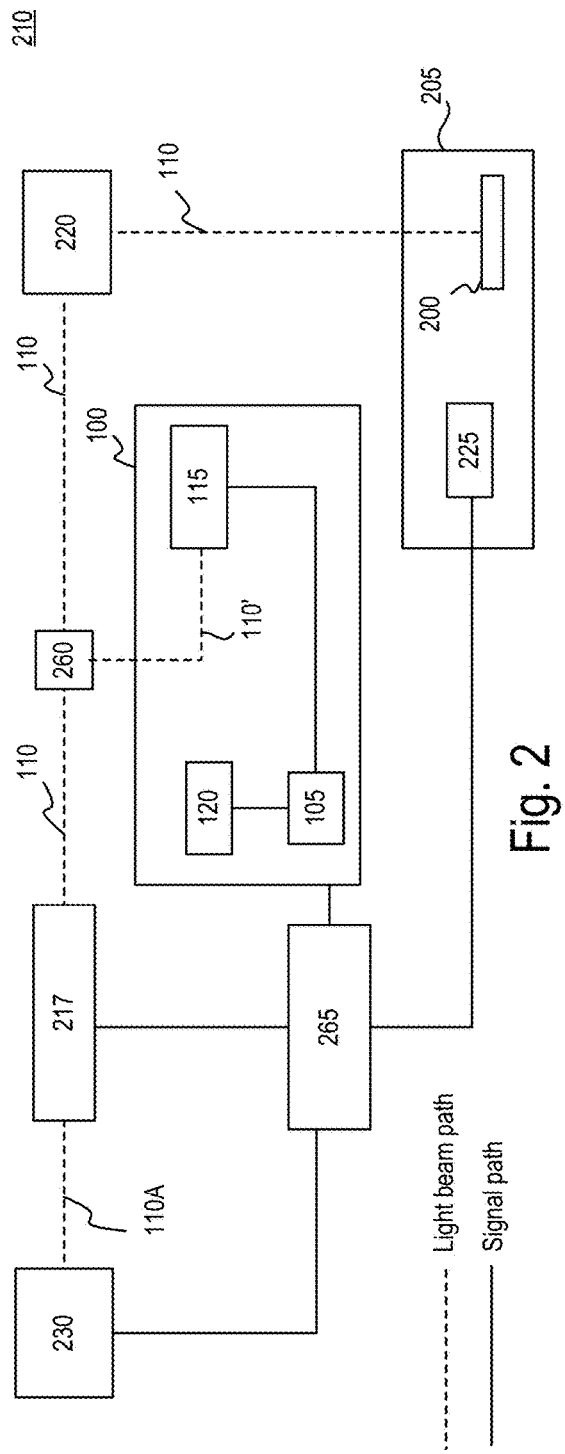
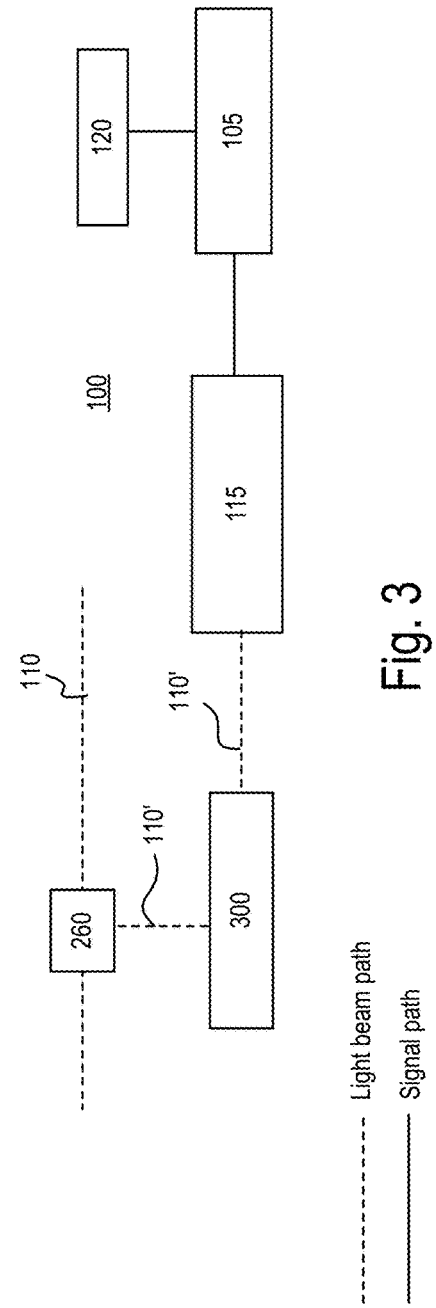
Fig. 2
Fig. 3

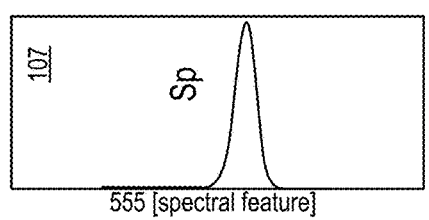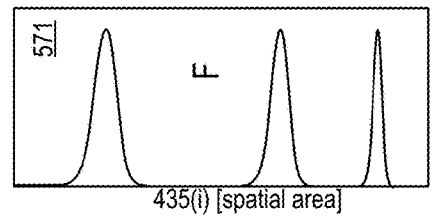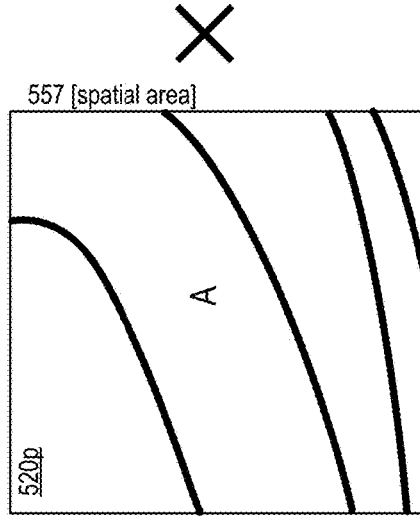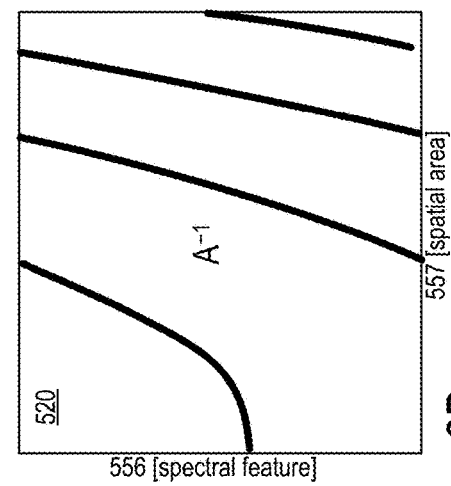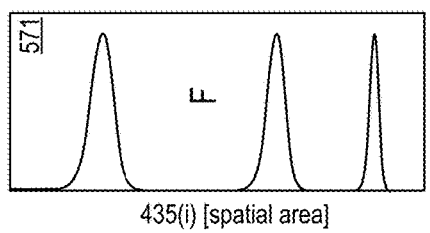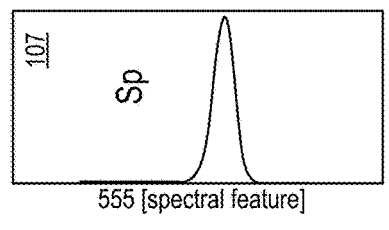

RECOVERING SPECTRAL SHAPE FROM SPATIAL OUTPUT

CROSS REFERENCE TO RELATED APPLICATION

This application claims the benefit of U.S. Application No. 62/483,423 filed Apr. 9, 2017 and titled RECOVERING SPECTRAL SHAPE FROM SPATIAL OUTPUT, which is incorporated herein by reference in its entirety.

TECHNICAL FIELD

The disclosed subject matter relates to an apparatus and method for recovering a spectral shape of a light beam from a spatial output produced by, for example, an etalon spectrometer to thereby estimate one or more spectral features (such as the bandwidth or wavelength) of the light beam.

BACKGROUND

In semiconductor lithography (or photolithography), the fabrication of an integrated circuit (IC) includes performing a variety of physical and chemical processes on a semiconductor (for example, silicon) substrate (which is also referred to as a wafer). A photolithography exposure apparatus or scanner is a machine that applies a desired pattern onto a target portion of the substrate. The wafer is irradiated by a light beam that extends along an axial direction, and the wafer is fixed to a stage so that the wafer generally extends along a lateral plane that is substantially orthogonal to the axial direction. The light beam has a wavelength in the deep ultraviolet (DUV) range, for example, from about 10 nanometers (nm) to about 400 nm. The light beam travels along the axial direction (which that is orthogonal to the lateral plane along which the wafer extends).

A spectral analysis module is used to measure spectral features of the light beam, and such measured spectral features are used to control aspects of the light beam. By controlling the light beam, various lithography properties can be controlled, For example, a minimum feature size or critical dimension (CD) at the wafer can be controlled, or pattern properties such as overlay, surface roughness, and proximity correction can be controlled.

SUMMARY

In some general aspects, a method is performed for estimating the optical spectrum of a light beam. The method includes: projecting the light beam onto distinct spatial areas of a spectrometer, wherein each spatial area receives a different filtered version of the optical spectrum; detecting a characteristic of the projected light beam at each of the distinct spatial areas of the spectrometer; receiving a two-dimensional matrix in which each entry of the matrix provides a relationship between one or more spatial areas and each spectral feature, wherein the two-dimensional matrix is related to the input-output relationship of the spectrometer; and estimating the optical spectrum of the light beam based on an analysis that uses both the detected light beam characteristics and the received two-dimensional matrix.

Implementations can include one or more of the following features. For example, the light beam can be projected onto distinct spatial areas of the spectrometer by separating the different filtered versions of the optical spectrum, and projecting these separated filtered versions onto respective spatial areas. The different filtered versions of the optical spectrum can be separated by sending each filtered version along a different direction or angle.

The light beam can be projected onto distinct spatial areas of a spectrometer by producing a plurality of light beams that interfere with each other, and the different filtered versions of the optical spectrum can result from different optical resonances in the transmission of the spectrometer.

Each spatial area can be a surface made up of one or more imaging elements of a detector.

The characteristic of the projected light beam can be detected at the distinct spatial areas by detecting the intensity of the light beam along at least one radial path that extends through the projected light beam. The characteristic of the projected light beam can be detected at the distinct spatial areas by detecting the energy deposited in the spatial areas by the filtered version of the optical spectrum.

The method can include creating the two-dimensional matrix by: interacting a test light beam with the spectrometer; changing a spectral feature of the test light beam across a range of N distinct spectral features; and, for each spectral feature in the range, detecting a characteristic of the test light beam at each spatial area; and storing the detected characteristic of the test light beam at each of M spatial areas of the spectrometer as a column of the preliminary two-dimensional matrix. The column is assigned based on the spectral feature and the preliminary two-dimensional matrix captures the input-output relationship of the spectrometer. The two-dimensional matrix can be calculated based on the preliminary two-dimensional matrix. The number of rows of the two-dimensional matrix and the number of columns of the preliminary two-dimensional matrix can equal N, and the number of columns of the two-dimensional matrix and the number of rows of the preliminary two-dimensional matrix can equal M. The optical spectrum of the light beam can be estimated by performing matrix multiplication between the two-dimensional matrix and the detected light beam characteristics. The test light beam can have a bandwidth that is 5-500,000 times smaller than the bandwidth of the light beam. The number N of distinct spectral features can determine a resolution of the estimated optical spectrum.

The method can include: creating the two-dimensional matrix by calculating a pseudoinverse of a preliminary two-dimensional matrix, wherein the preliminary two-dimensional matrix captures the input-output relationship of the spectrometer; and storing the two-dimensional matrix. The optical spectrum of the light beam can be estimated by performing matrix multiplication between the two-dimensional matrix and the detected light beam characteristics. The pseudoinverse of the preliminary two-dimensional matrix can be calculated by performing a singular value decomposition on the preliminary two-dimensional matrix. The method can include reducing an impact of noise by reducing the components of the matrix product for which contributions from the noise exceed contributions from the signal.

The spectral feature can be a wavelength and the optical spectrum can describe a distribution of the optical power of the light beam over different wavelengths.

The method can include storing the detected characteristics of the projected light beam in an array. The number of rows of the array corresponds to the number of rows of distinct spatial areas of the spectrometer in one spatial direction and the number of columns of the array corresponds to the number of columns of distinct spatial areas of the spectrometer in another spatial direction. The number of columns of the array can equal one and the number of rows of the array can equal M; and the number of columns of the two-dimensional matrix can equal M.

The method can include calculating a spectral feature based on the estimated optical spectrum. The spectral feature can include one or more of a wavelength and a bandwidth.

In other general aspects, a metrology apparatus is configured to estimate the optical spectrum of a light beam. The apparatus includes: a spectrum dispersing means for separating the light beam into different filtered versions of the optical spectrum and for projecting the light beam onto distinct spatial areas, wherein each spatial area receives a different filtered version of the optical spectrum; a detecting means for detecting a characteristic of the projected light beam at each spatial area; and a processing means. The processing means is for: receiving a two-dimensional matrix in which each entry of the matrix provides a relationship between one or more spatial areas and each spectral feature, wherein the two-dimensional matrix is related to the input-output relationship of the spectrum dispersing means; analyzing the detected light beam characteristics and the received two-dimensional matrix; and estimating the optical spectrum of the light beam based on the analysis.

In other general aspects, a metrology apparatus includes: a spectrometer in the path of a light beam, and a control system connected to the spectrometer. The spectrometer includes: a spectrum dispersing device configured to separate the light beam into different filtered versions of the optical spectrum; and a detector in the path of the projected light beam and defining distinct spatial areas, the detector being configured to receive a different filtered version of the optical spectrum at each spatial area and to detect a characteristic of the projected light beam at each distinct spatial area. The control system is configured to: receive a two-dimensional matrix in which each entry of the matrix provides a relationship between one or more spatial areas and each spectral feature, wherein the two-dimensional matrix is related to the input-output relationship of the spectrometer; analyze the detected light beam characteristics and the received two-dimensional matrix; and estimate an optical spectrum of the light beam based on the analysis.

Implementations can include one or more of the following features. For example, the spectrum dispersing device can be configured to separate the light beam into the different filtered versions of the optical spectrum by performing spatially-dependent spectral filtering of the light beam and transmitting different wavelengths of the light beam at different transmission intensities in accordance with the two-dimensional matrix.

The spectrum dispersing device can include an interference optical apparatus. The interference optical apparatus can include: an etalon configured to separate the light beam into the different filtered versions of the optical spectrum by producing a plurality of light beams that interfere with each other, and a lens configured to project the different filtered versions onto the distinct spatial areas of the detector. The etalon can angularly separate the different filtered versions of the optical spectrum and the spatial areas of the detector can be arranged along a radial direction from a center region. The number of rows of the two-dimensional matrix can equal N, and N can equal a range of distinct spectral features that are stored in the rows of the two-dimensional matrix. The range of distinct spectral features can span at least one free spectral range of the etalon and the number N of distinct spectral features determines a resolution of the estimated optical spectrum.

The detector can include a photodiode detector apparatus. The photodiode detector apparatus can include a photodiode array that extends along one direction.

The detector can sense an energy deposited at distinct spatial areas by the spectral feature distribution.

The control system can include memory configured to store the detected characteristics of the projected light beam in an array, wherein the number of rows of the array corresponds to the number of rows of distinct spatial areas of the detector in a first spatial direction and the number of columns of the array corresponds to the number of columns of distinct spatial areas of the detector in a second spatial direction. The first spatial direction can be a radial direction and the second spatial direction can be perpendicular to the radial direction. The number of columns of the array can equal one and the number of rows of the array can equal M; and the number of columns of the two-dimensional matrix can equal M.

A test light source can be configured to produce a test light beam. The spectrometer can interact with the test light beam. A spectral feature actuation apparatus can control a spectral feature of the test light beam. The spectral feature actuation apparatus can be configured to change a spectral feature of the test light beam across a range of N distinct spectral features while the test light beam interacts with the spectrometer; the detector can be configured to detect a characteristic of the test light beam at each spatial area; and the control system can be connected to the test light source and the spectral feature actuation apparatus. The control system can be configured to create the two-dimensional matrix by: for each spectral feature in the range, storing the detected characteristic of the test light beam at each of M spatial areas of the spectrometer as a column of the preliminary two-dimensional matrix, wherein the column is assigned based on the spectral feature and wherein the preliminary two-dimensional matrix captures the input-output relationship of the spectrometer.

The test light beam can have a bandwidth that is 5-500,000 times smaller than the bandwidth of the light beam. The test light source can include a single frequency all-solid-state laser.

DESCRIPTION OF DRAWINGS

FIG. 2 is a block diagram of a photolithography system in which the metrology apparatus of FIG. 1 is incorporated;

FIG. 3 is a block diagram showing how the metrology apparatus is incorporated into the photolithography system of FIG. 2;

FIG. 6A shows, in graph form, a relationship between the optical spectrum of the light beam, the preliminary two-dimensional matrix, and the fringe pattern formed from the output of the metrology apparatus;

FIG. 6B shows, in graph form, how to recover the optical spectrum of the light beam based on the two-dimensional matrix, which is a pseudoinverse of the preliminary two-dimensional matrix of FIG. 6A and the fringe pattern formed from the output of the metrology apparatus;

DESCRIPTION

Figure 1:
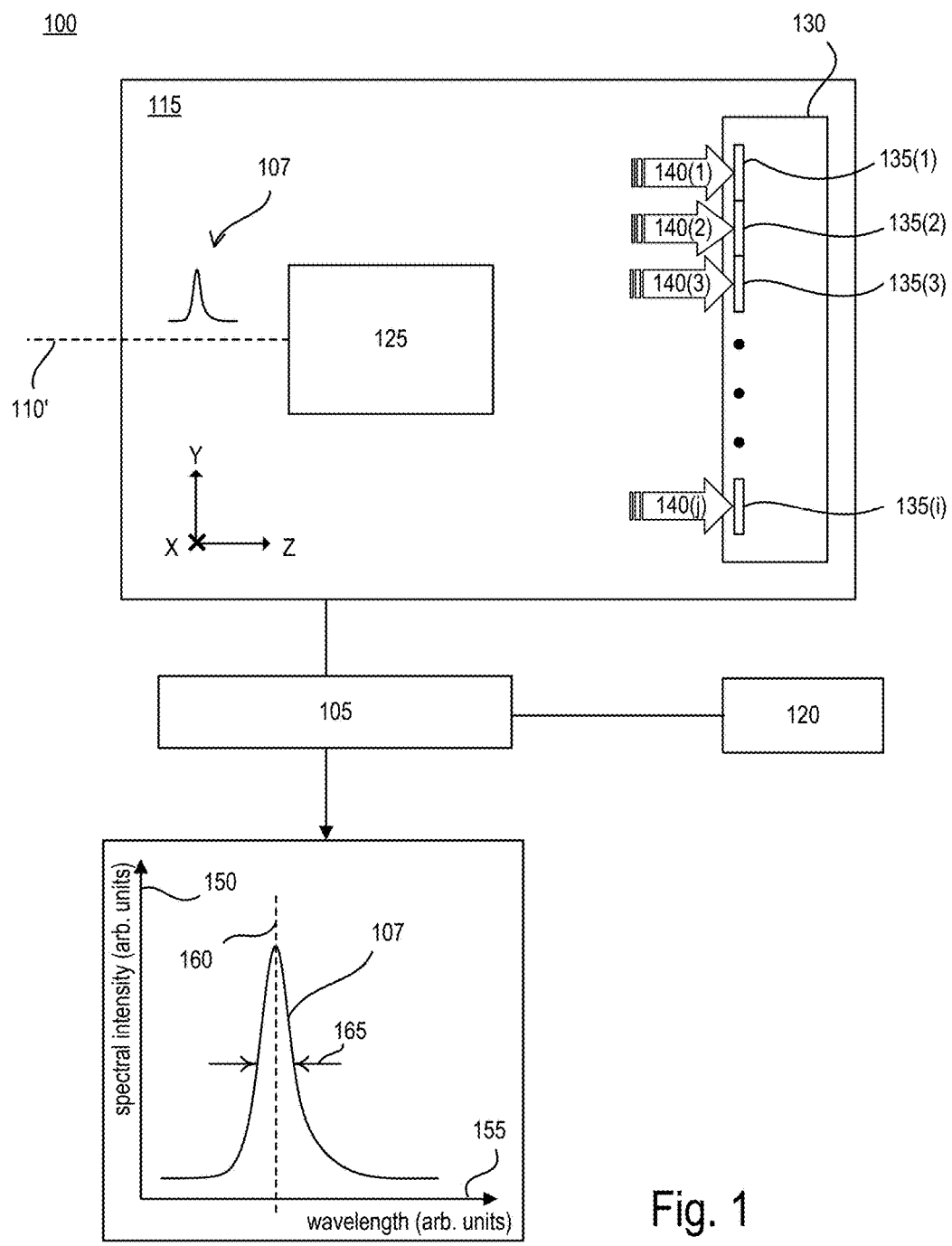
FIG. 1 is a block diagram of a metrology apparatus that measures or analyzes spectral features of a light beam produced by an optical source and directed to a wafer based at least in part on detected characteristics of the light beam and a two-dimensional matrix.

Referring to FIG. 1, a metrology apparatus 100 includes a spectrometer 115 and a metrology control module 105 that is in communication with the spectrometer 115. The metrology control module 105 directly recovers (or characterizes) an optical spectrum 107 of a pulsed light beam 110' based at least in part on an analysis of the output from the spectrometer 115 and a two-dimensional matrix 120, which is related to the input-output relationship of the spectrometer 115.

The optical spectrum 107 of the pulsed light beam 110' contains information about how the optical energy, intensity, or power of the light beam 110' is distributed over different wavelengths (or optical frequencies). The optical spectrum 107 of the light beam 110' is depicted in the form of a diagram in which the spectral intensity 150 is plotted as a function of the wavelength 155 or the optical frequency. Spectral features of the light beam 110' include an aspect or representation of the optical spectrum 107. For example, a wavelength at a particular value of intensity is a spectral feature (such as the wavelength 160 at the peak intensity). As another example, a width 165 of a shape of the optical spectrum 107 is a spectral feature. This width can be referred to as a bandwidth. Thus, by recovering or estimating the optical spectrum 107 of the light beam 110', these one or more spectral features can be calculated.

Referring also to FIG. 2, the light beam 110' that is directed through the metrology apparatus 100 is separated from a pulsed light beam 110 that is directed toward a semiconductor substrate (or wafer) 200 within a photolithography exposure apparatus (or scanner) 205. To this end, as also shown in FIG. 3, a beam separator 260 such as a beam splitter can be used to remove and direct a fraction of the light beam 110 in the form of the light beam 110' into the metrology apparatus 100. In some implementations, the majority of the pulsed light beam 110 is directed in toward the photolithography exposure apparatus 205. For example, the beam separator 260 directs a fraction (for example, 1-2%) of the pulsed light beam 110 into the metrology apparatus 100 and thus the pulsed light beam 110' has about 1-2% of the power of the pulsed light beam 110.

The light beam 110 and the wafer 200 are scanned (moved) relative to each other to thereby pattern microelectronic features on the wafer 200. The spectral features of the light beam 110 have a direct impact on the quality of imaging quality at the wafer 200. The spectral features of the light beam 110 can be quantified using any suitable metric or metrics, and these metrics can be measured and analyzed by the metrology control module 105 in order to determine whether adjustments need to be made to the light beam 110 to control the spectral features of the light beam 110 during patterning on the wafer 200.

The bandwidth of the light beam 110 is a measure of the width 165 of the optical spectrum 107, and this width 165 can be given in terms of wavelength, frequency, or wavenumber of the laser light. Any suitable mathematical construction (that is, a metric) related to the details of the optical spectrum 107 can be used to estimate the bandwidth of the light beam. For example, the full width of the optical spectrum 107 at a fraction (X) of the maximum peak intensity of the spectral shape (referred to as FWXM) can be used to characterize the light beam bandwidth. As one example, in a commonly used spectral-shape characterization, the fraction X is 50% and the respective metric is referred to as the full width at half maximum (FWHM). As another example, the width of the optical spectrum 107 that contains a fraction (Y) of the integrated spectral intensity (referred to as EY) can be used to characterize the light beam bandwidth. In one example, in common use for characterizing the spectral properties of the light beam 110, the fraction Y is 95%.

As mentioned above, the metrology apparatus 100 provides an accurate way to measure or analyze these spectral features of the light beam 110 so as to control the patterning of the wafer 200 by using not only the output from the spectrometer 115 but also the two-dimensional matrix 120 to analyze the output from the spectrometer 115.

Referring again to FIG. 1, the spectrometer 115 includes a spectrum dispersing device 125 and a detector 130 having a plurality of distinct spatial areas 135(1), 135(2), ... 135(i), where i is the total number of distinct spatial areas. The spectrum dispersing device 125 is any device that is configured to separate the light beam 110' into different filtered versions 140(1), 140(2), ... 140(j) of the optical spectrum 107, where j is the total number of different filtered versions of the optical spectrum 107. The spectrum dispersing device 125 preferentially passes certain wavelengths or spectral features of the light beam 110' more than others in accordance with the two-dimensional matrix 120. The spectrum dispersing device 125 projects these different filtered versions 140(1), 140(2), ... 140(j) onto the distinct spatial areas 135(1), 135(2), ... 135(i) of the detector 130. The spectrum dispersing device 125 separates the light beam 110' into the different filtered versions by performing spatially-dependent spectral filtering of the light beam 110' and transmitting different wavelengths of the light beam 110' at different transmission intensities in accordance with the two-dimensional matrix 120.

The distinct spatial areas 135(1), 135(2), ... 135(i) can extend along a plane that is perpendicular to a direction at which the light beam 110' is traveling. For example, if the general direction of the light beam 110' is along the Z direction, and the different filtered versions that are directed to the detector 130 travel generally along the Z direction, then the spatial areas 135(1), 135(2), ... 135(i) can lie in a plane (such as the X-Y plane) that is perpendicular with the Z direction. The distinct spatial areas 135(1), 135(2), . . . 135(i) can be arranged in any shape in this plane. For example, the distinct spatial areas 135(1), 135(2), . . . 135(i) can be arranged in an array. The array could be a two-dimensional array that extends both along the X direction and the Y direction. The array could be a one-dimensional array that extends along a direction that lies along the X-Y plane or along a radial direction.

The total number i of distinct spatial areas 135(1), 135(2), . . . 135(i) depends on the design of the detector 130, the design of the spectrum dispersing device 125, the efficiency of the spectrum dispersing device 125, and the spectral features of the light beam 110'. The total number i of distinct spatial areas 135(1), 135(2), . . . 135(i) can be any value from 2 to tens, hundreds, or thousands. For example, the number i of distinct spatial areas 135(1), 135(2), . . . 135(i) can correspond to the number j of different filtered versions 140(1), 140(2), . . . 140(j). The total number i of distinct spatial areas 135(1), 135(2), . . . 135(i) is constrained by several factors. For example, the detector 130 and the distinct spatial areas 135(1), 135(2), . . . 135(i) need to be sensitive to the wavelength of the light beam 110' and if the light beam 110' is in the DUV wavelength range, then the detector 130 should be sensitive to light having DUV wavelengths. Moreover, the total number i of distinct spatial areas 135(1), 135(2), . . . 135(i) is also constrained by the maximum read-out rate of the detector 130 as well as the time interval between the pulses of the light beam 110'. In the example in which the pulses of the light beam 110' are produced at a rate of 6 kHz, and the light beam 110' has a wavelength in the DUV range, then the total readout time R is about 167 microseconds (µs) (which is the time between successive pulses at the spatial areas). The relationship between the per-pixel readout frequency P and the number N of distinct spatial areas should be satisfy the relationship $N(1/P)<R$, allowing sufficient time for storing and/or processing the data from one readout before the next readout occurs. If R is about 167 µs and at a 10 MHz per-pixel readout frequency P, then the total number i of distinct spatial areas can be 1024. In this example, 1024 (1/10MHZz) is about 102 µs, which is less than 167 µs.

The different filtered versions 140(1), 140(2), . . . 140(j) of the optical spectrum 107 are distributions of the intensity of the light beam 110' that have been separated by the spectrum dispersing device 125 based on the values of the spectral feature (the wavelength) of the light beam 110'. The filtered version 140(1) can be defined as the version that is projected onto the spatial area 135(1), and similarly, each filtered version 140 can be defined as the filtered version that is projected onto a particular spatial area 135.

In some implementations, the spectrum dispersing device 125 is an optical interference-based device in which the light beam 110' is separated into the different filtered versions 140(1), 140(2), . . . 140(j) of the optical spectrum 107 by producing a plurality of light beams that optically interfere with each other. The different filtered versions 140(1), 140(2), . . . 140(j) of the optical spectrum 107 result from different optical resonances in the output or transmission of the spectrometer 115. An exemplary optical interference-based device is an etalon or a grating. Such a device can be used in conjunction with a lens that is configured to project the different filtered versions onto the distinct spatial areas of the detector 130. The lens can be placed at the output of the etalon so that it images the light to a focal plane that coincides with the spatial areas of the detector 130. An exemplary optical interference-based device is discussed below and with reference to FIGS. 4A and 4B.

In other implementations, the spectrum dispersing device 125 is an optical dispersive-based device in which the light beam 110' is separated into the different filtered versions of the optical spectrum 107 using the optical phenomenon of refraction. An exemplary optical dispersive-based device is a prism in which the different wavelengths of the light beam 110' are refracted by different angles through the prism because the refractive index of the material of the prism varies with the wavelength of the light beam 110'.

The detector 130 is configured to receive a different filtered version 140(1), 140(2), . . . 140(j) of the optical spectrum 107 at each spatial area 135(1), 135(2), . . . 135(i) and to detect a characteristic of the projected light beam (such as, the intensity) at each spatial area 135(1), 135(2), . . . 135(i). For example, the detector 130 can detect or sense an energy deposited at each spatial area 135(1), 135(2), . . . 135(i) by the respective optical spectrum filtered version 140(1), 140(2), . . . 140(j). A spatial area 135(1), 135(2), . . . 135(i) is any surface or region onto which the photons of the spectral feature distribution impinge and interact, and the spatial area is able to convert the energy of the photons into an electric current for further processing by the metrology control module 105.

In some implementations, the detector 130 includes a photodiode detector having an array of photodiodes, with each photodiode acting as a distinct spatial area. In other implementations, the detector 130 includes a single photodetector (such as a resistive photocathode), with each region of the photodetector corresponding to a distinct spatial area. Each spatial area 135(1), 135(2), . . . 135(i) of the detector 130 can be a surface made up of one or more imaging elements or distinct detection regions (for example, photodiodes) of the detector 130. The output of the detector 130 can be in the form of a current, a charge, or a voltage.

The metrology control module 105 generally includes or has access to memory in which the detected characteristics from the detector 130 are stored. Moreover, the memory could store the two-dimensional matrix 120 or the metrology control module 105 could include an input module for receiving the two-dimensional matrix 120 from external memory.

Referring to FIG. 3, although not required, the metrology apparatus 100 can include a beam preparation system 300, which includes, among other features, a beam homogenizer. The beam preparation system 300 modifies aspects of the light beam 110' prior to the light beam 110' entering the spectrometer 115. For example, the beam homogenizer reduces speckle noise, improves beam homogenization of the pulsed light beam 110', and ensures uniform sampling of the different spatial parts of the light beam 110' into the spectrometer 115. The beam preparation system 300 can include other elements or components for modifying aspects of the pulsed light beam 110'. For example, the beam preparation system 300 can also include one or more pulse stretcher systems, one or more diffuser systems, and one or more spatial adjustment systems.

Referring again to FIG. 2, the metrology apparatus 100 is incorporated into a photolithography system 210 and provides an accurate way to measure or analyze the spectral features of the light beam 110 that is used to pattern the wafer 200. The photolithography system 210 includes an optical source 217 (such as an excimer light source) that produces the light beam 110, under control of a control system 265. The control system 265 can be considered as a representation of a set of sub-controllers, with each sub-controller being designed or dedicated to control some aspect of the photolithography system 210. For example, the control system 265 can include a dedicated sub-controller for controlling the optical source 217 and a dedicated sub-controller for interfacing with the metrology control module 105. Other sub-controllers are possible and it is possible for various sub-controllers to be co-located or separated from each other.

In some implementations, the light beam 110 can be a continuous light beam, which means that the optical source 217 continuously emits the light beam 110.

In implementations described herein, the light beam 110 is formed of pulses, which means that the optical source 217 emits the light beam 110 not in a continuous mode, but rather in the form of optical pulses.

The pulses of the light beam 110 have a wavelength that is nominally at a center wavelength in the deep ultraviolet (DUV) range, for example, between about 10 nanometers (nm) to about 400 nm. In some implementations, the wavelength of the pulses is about 248 nm while in other implementations, the wavelength of the pulses is about 193 nm. In this example, the metrology apparatus 100 is placed at an output of the optical source 217 or at an appropriate location (such as following a gas discharge amplifier) within the optical source 217. Alternatively, it is possible to place the metrology apparatus 100 at other locations within the photolithography system 210 or to include a plurality of metrology apparatuses 100 placed at distinct locations within the photolithography system 210.

In some implementations, the optical source 217 emits light in the form of optical pulses, rather than a continuous wave. Thus, the optical source 217 emits pulses of energy that have a short time duration. These periodic pulses can be considered a pulse train and form the light beam 110. The duration of a pulse (also called the pulse width or length) can be defined as the time during which the power of the pulse remains continuously above a percentage (for example a half) of its maximum value. Another metric that can be used to determine the duration of the pulse is the width of the pulse that contains a fraction (Y) of the integrated shape of the pulse. Yet another metric is the time integral square metric.

The light beam 110 is directed to the photolithography exposure apparatus 205 by way of a beam preparation system 220 that can include beam directing and beam modification optics. Specifically, within the photolithography exposure apparatus 205, the pulsed light beam 110 is directed through an optical arrangement, which is configured to prepare and modify the light beam 110 as needed before directing the light beam 110 toward the wafer 200. The light beam 110 and the wafer 200 are scanned (moved) relative to each other under the control of a lithography controller 225 to thereby pattern the microelectronic features on the wafer 200. The size of the microelectronic features patterned on the wafer 200 depends on the wavelength of the light beam 110, with a lower wavelength being one of the possible ways to realize a smaller minimum size of the microelectronic feature. When the wavelength of the light beam 110 is 248 nm or 193 nm, the minimum size of the microelectronic features can be, for example, 50 nm or less. The focus location of the pulses of the light beam 110 at the wafer 200 correlates with the wavelength of the light beam 110. Moreover, the bandwidth of the light beam 110 can impact the critical dimension (CD) of these features or other process characteristics.

Various disturbances (such as, for example, temperature gradients, pressure gradients, optical distortions) act on the optical source 217 and the light beam 110 to modify characteristics such as the spectral features (such as the bandwidth and the wavelength) or the energy of the light beam 110. For example, wavefront distortion caused by thermal lensing in optical components in the optical source 217 or that interact with the light beam 110 can cause an increase in the bandwidth of the light beam 110. As another example, chromatic aberration caused by optical components that interact with the light beam 110 in the gain medium of the optical source 217 can cause an increase in the bandwidth of the light beam 110. Thus, the photolithography system 210 includes other components, such as, for example, a spectral feature selection system 230 (which is configured to adjust one or more spectral features of the light beam 110) and the metrology apparatus 100 (which is configured to measure one or more characteristics of the light beam 110). Along with the control system 265, these components are used in combination to determine the impact of the disturbances on the light beam 110 and to correct for the effect of such disturbances on the light beam 110.

While not shown, the photolithography system 210 can include other measurement systems besides the metrology apparatus 100 for measuring other aspects of the light beam 110 or for measuring other aspects of the scanner 205.

Figure 4A:
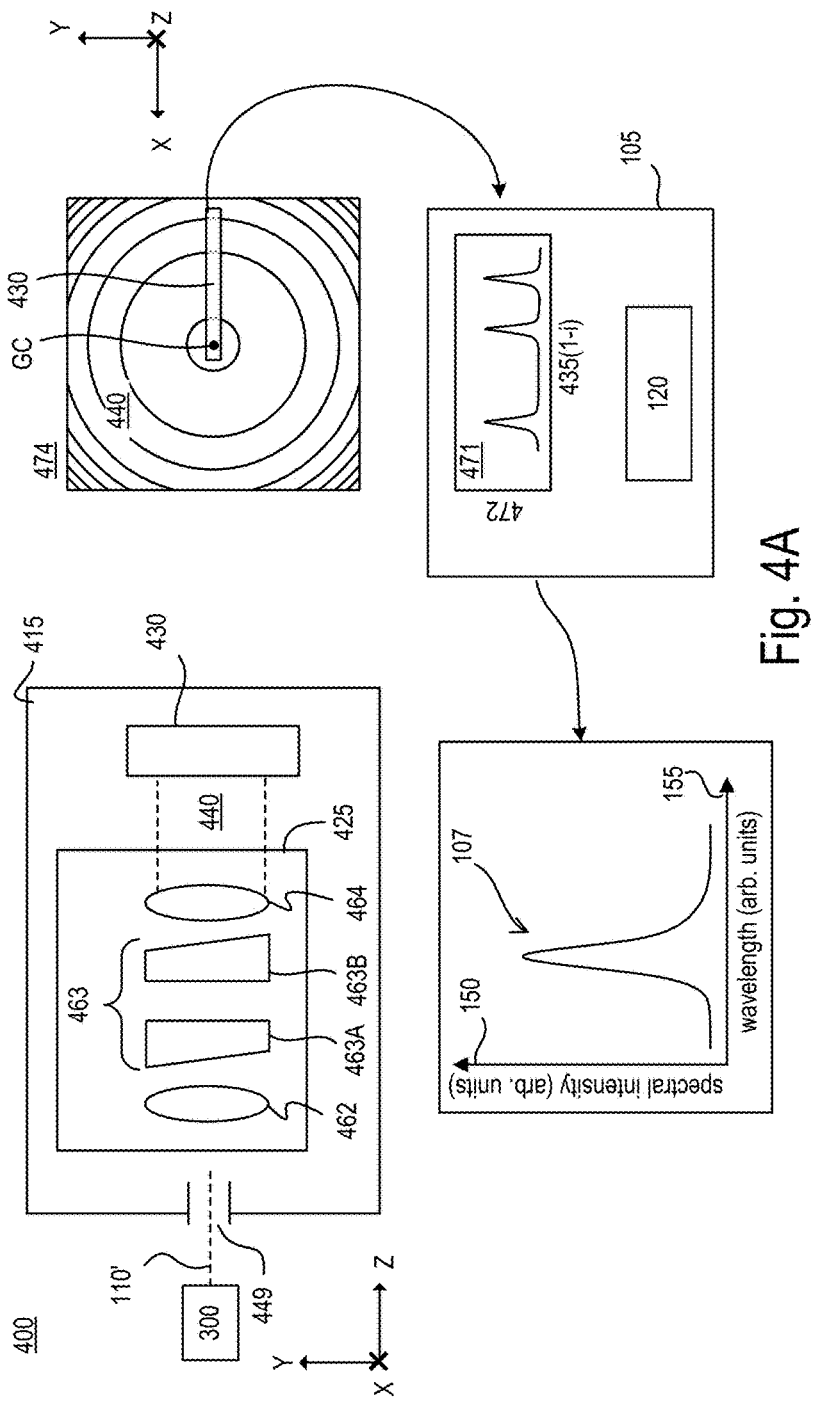
FIG. 4A is a block diagram of an exemplary metrology apparatus that includes a spectrometer that is an optical interference-based device.
Figure 4B:
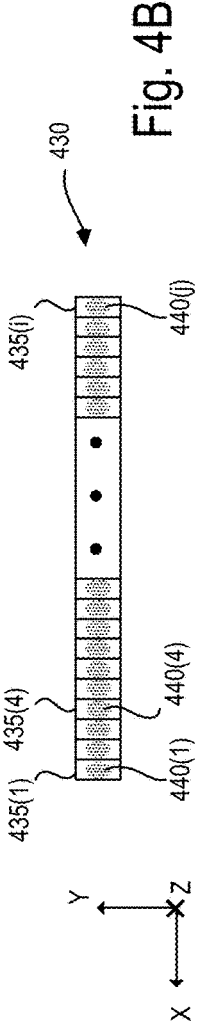
FIG. 4B is a side plan view of an exemplary detector that can be used in the spectrometer of FIG. 4A.

Referring to FIGS. 4A and 4B, an exemplary metrology system 400 includes a spectrometer 415 that is an optical interference-based device in which the light beam 110' is separated into the different filtered versions 440(1), 440(2), . . . 440(j) of the optical spectrum 107 by producing a plurality of light beams that optically interfere with each other. The spectrometer 415 includes, as the spectrum dispersing device 125, an etalon apparatus 425, and a detector 430, which can be a photodiode array.

The etalon apparatus 425 separates the light beam 110' into the different filtered versions 440(1), 440(2), etc. of the optical spectrum 107 (represented as element 440 in FIG. 4A). Because of the shape of the etalon in the etalon apparatus 425, the optical spectrum filtered versions 440(1), 440(2), etc. extend radially out from the central axis of the light beam 110' along the X-Y image plane. These filtered versions 440(1), 440(2), etc. extend over the full image plane, and they appear as being localized at particular values of the radius, such radial values corresponding to the plural orders at which the predominant component of the spectral feature has constructive interference. If the bandwidth of the light beam 110' is much smaller than the free spectral range of the etalon, then one particular order has a unique relationship between the radius at the image plane and the wavelength of the maximum transmission. When viewing the filtered versions 440(1), 440(2), etc. in the X-Y image plane, the overall shape of the pattern 474 appears as concentric but fuzzy rings, where the value of the intensity of the light beam 110' in a particular filtered version 440(1) remains approximately constant along the circumference of a particular ring. To put it another way, the filtered version 440(1) is the same or substantially the same at all points along a given circumference.

The etalon apparatus 425 includes an input lens 462, an optical frequency separation apparatus (such as an etalon) 463, and an output lens 464. An aperture 449 can be placed at a focal plane of the input lens 462 so that each point from the focal plane acts as a point source and accordingly, the input lens 462 acts to collimate the pulsed light beam 110' before entering the etalon 463. The output lens 464 is positioned at the exit of the etalon 463 so that the focal plane of the output lens 464 overlaps the spatial areas 435(1), 435(2), . . . 435(i) of the detector 430.

In some implementations, the etalon 463 includes a pair of partially reflective glass or optical flats 463A, 463B, which can be spaced a short distance (for example, tens or hundreds of micrometers, millimeters, or centimeters) apart, with the reflective surfaces facing each other. In other implementations, the etalon 463 includes a single plate with two parallel reflecting surfaces. The flats 463A, 463B can be made in a wedge shape to prevent the rear surfaces from producing spurious interference fringes; the rear surfaces often also have an anti-reflective coating. As the light beam 110' passes through the paired flats 463A, 463B, it is multiply reflected, and produces a plurality of transmitted rays, specifically a plurality of different filtered versions 440(1), 440(2), etc. of the optical spectrum 107, and these filtered versions are collected by the output lens 464 and brought to the spatial areas 435(1), 435(2), . . . 435(i) of the detector 430. Each spatial area 435(i) receives a different filtered version 440(j) of the optical spectrum 107. The spectrometer 415 also can include an optical relay, as needed, between the output lens 464 and the detector 430 to ensure that the spatial areas 435(1), 435(2), etc. are at the focal plane of the output lens 464.

The etalon 463 interacts with the light beam 110' and outputs a plurality of filtered versions 440(1), 440(2), etc. of the optical spectrum 107 (examples of which are shown in schematic form in FIG. 4B). The filtered versions 440(1), 440(2), etc. of the optical spectrum 107 correspond to how the values of the optical energy or power (the spectral intensity) of the pulsed light beam 110' are distributed over the different wavelengths. These filtered versions 440(1), 440(2), etc. are separated out so that each spatial area 435(1), 435(2), etc. receives a different filtered version 440(1), 440(2), etc. Thus, the etalon 463 transforms the spectral information (such as the wavelength) of the pulsed light beam 110' into spatial information that can be sensed or detected by the sensor 430. Because of the design of the etalon 463, the transformation maps the spectral information (such as the wavelength) to different angular or radial positions in space so that the spectral information that can be observed by the sensor 430.

As mentioned above, the etalon 463 produces, as the optical spectrum filtered versions, an interference pattern 474 that takes the appearance of a set of concentric rings. The sharpness of the rings depends on the reflectivity of the flats 463A, 463B of the etalon 1863. Thus, if the reflectivity of the flats 463A, 463B is high (such that the etalon has a high quality (Q) factor), when the light beam 110' is a monochromatic light beam, the etalon 463 produces a set of narrow bright rings against a dark background. The filtered versions 440(1), 440(2), etc. that are transmitted from the etalon 463 impinge upon their respective spatial area 435(1), 435(2), etc. Each portion of the ring of the interference pattern 474 corresponds to maximum transmission for only particular wavelengths. Moreover, the radial width of a ring decreases with distance from the geometric center (GC) of the interference pattern 474.

The detector 430 detects a characteristic 472 of the projected light beam 110' at each angularly-separated spatial area 435(1), 435(2), etc. For example, the detector 430 detects as the characteristic an energy deposited into each spatial area 435(1), 435(2). The detected energies deposited into each spatial area 435(1), 435(2), etc. are stored in memory accessible by the metrology control module 105. A plot of these detected energies 472 versus the spatial areas 435(1), 435(2), etc. produces a fringe pattern 471. Each ring of the interference pattern 474 generates a fringe in the fringe pattern 471. Thus, a fringe is a curved shape with a maximum transmission that corresponds to a bright center of a ring in the interference pattern 474. The location of the maximum transmissions (maximum values of the detected energies 472) of the fringe pattern 471 depends at least in part on the wavelength of the light beam 110', the index of refraction of the optical flats 463A, 463B, and the separation between the optical flats 463A and 463B. Moreover, the width of each fringe in the fringe pattern 471 depends at least in part on the distance of the spatial area 435 from the center GC of the interference pattern 474 and the finesse of the etalon 463. The finesse of the etalon 463 is its free spectral range divided by the bandwidth of its resonances. The finesse of the etalon 463 is determined by losses within the etalon 463 and is independent of the separation between the optical flats 463A, 463B. The finesse of the etalon 463 is the Q factor times the free spectral range divided by the frequency of the resonances.

This fringe pattern 471 provides some information about the optical spectrum 107, but this information is superposed with the information about the spectrometer 415. The two-dimensional matrix 120 is a representation of the input-output characteristics of the spectrometer 115. Accordingly, the metrology control module 105 extracts the optical spectrum 107 from the fringe pattern 471 using the two-dimensional matrix 120. The fringe pattern 471 can be formed by a subset of the spatial areas 435(1), 435(2), etc. that are available as opposed to all of the spatial areas of the detector 430 because the complete interference pattern 474 is not needed to perform these calculations or estimates. Additionally, it is possible to generate only fringes within a region that is slightly larger than an active area of the detector 430.

The spatial areas 435(1), 435(2), etc. of the detector 430 receive and sense the intensity of the light beam 110'. For example, one type of suitable detector 430 that can be used to measure along one dimension (such as a radial dimension) is a linear photodiode array. The linear photodiode array consists of multiple elements of the same size, formed in a linear arrangement at an equal spacing in one package. The photodiode array is sensitive to the wavelength of the light beam 110', and if the light beam 110' has a wavelength in the deep ultraviolet range, then the photodiode array is sensitive to light having a wavelength in the deep ultraviolet range. As another example, the detector 430 can be a two dimensional sensor such as a two-dimensional charged coupled device (CCD) or a two-dimensional complementary metal oxide semiconductor (CMOS) sensor. The detector 430 should be able to read out data at a fast enough rate, for example, at about 6 kHz for the entire detector 430.

The metrology control module 105 is connected to the output of the detector 430 as well as to the control system 265, which is in communication with the optical source 217 and the spectral feature selection system 230 that is optically coupled to the pulsed light beam 110. The metrology control module 105 uses the output from the detector 430 as well as the two-dimensional matrix 120 to estimate the optical spectrum 107 of the light beam 110. Moreover, the metrology control module 105 can perform the measurement, analysis, and calculation for each pulse of the light beam 110 or for a set of pulses of the light beam 110.

Figure 5:
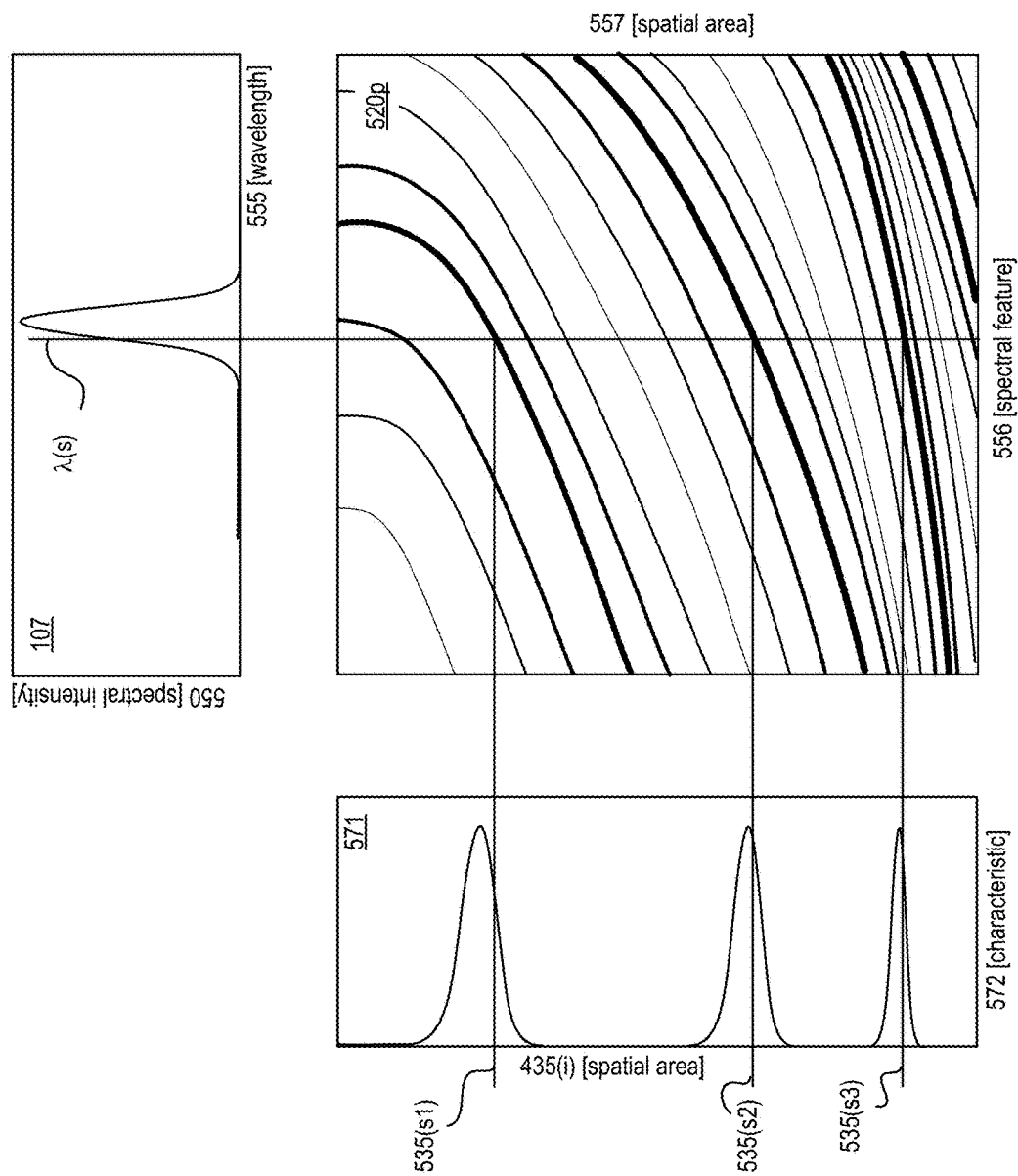
FIG. 5 shows a set of graphs to illustrate the relationship between a fringe pattern formed from an output of the metrology apparatus, a preliminary two-dimensional matrix from which the two-dimensional matrix is calculated, and an optical spectrum of the light beam.

An exemplary fringe pattern 571 is shown in FIG. 5. The fringe pattern 571 is created due to the interaction of the light beam 110' with the spectrometer 415 and shows the detected characteristic 572 as a function of spatial area 435(i) of the detector 430. As discussed above, the two-dimensional matrix 120 is related to the input-output relationship of the spectrometer 415. Moreover, the two-dimensional matrix 120 is created based on a preliminary two-dimensional matrix, which captures the input-output relationship of the spectrometer 415. This preliminary two-dimensional matrix 520*p* is shown in FIG. 5. The preliminary two-dimensional matrix 520*p* describes how a particular spectral feature 556 (such as wavelength) of the light beam 110' is mapped to the spatial areas 557 of the detector 430, where each spatial area 557 of the preliminary two-dimensional matrix 520*p* corresponds to a spatial area 435(1), 435(2), etc. The visible lines shown on the preliminary two-dimensional matrix 520*p* are contour lines in which the elements within the matrix 520*p* have a constant value. The value of the contour line is represented by the thickness of the line and thus, thinner lines represent smaller values while thicker lines represent larger values. For simplicity, only a few contour lines are shown, but the number of contour lines would be significantly greater than what is shown.

For example, the intensity at a wavelength λ(s) of the light beam 110' (shown in the optical spectrum 107) is mapped to the spatial areas 435(*i*), with an amplitude of the mapped intensity being proportional to the value of the matrix 520*p* at that wavelength. Thus, each wavelength of the light beam 110' produces its own fringe pattern. As an example, the intensity at the wavelength λ(s) of the light beam 110' is mapped to spatial areas 535(*s*1), 535(*s*2), 535(*s*3) by the spectrometer 415 for the maximum values of the preliminary two-dimensional matrix 520*p*. The fringe pattern 571 is therefore a superposition of the fringe patterns that correspond to each mapped wavelength of the light beam 110'. To put this another way, each spatial area 435 in the fringe pattern 571 corresponds to an integrated energy of each filtered version associated with that spatial area 435.

Each entry within the preliminary two-dimensional matrix 520*p* indicates an intensity at a particular spectral feature 556 of the light beam 110' and a particular spatial area 557 of the detector 430. Some entries in the preliminary two-dimensional matrix 520*p* are low values, which means that the intensity at that particular spectral feature 556 of the light beam 110' and that particular spatial area 557 of the detector 430 is close to or near zero (for example, the lightest contour lines can correspond to these low values). On the other hand, some entries in the preliminary two-dimensional matrix 520*p* have high values, which means that the intensity at that particular spectral feature 556 of the light beam 110' and that particular spatial area 557 of the detector 430 is both non-zero but substantially greater than zero. These high value regions are shown at the dark lines in the preliminary two-dimensional matrix 520*p* of FIG. 5. The shape of the dark lines and empty space in the preliminary two-dimensional matrix 520*p* is representative of a spectrometer 415 that has a plane-parallel etalon 463 design. Moreover, in this exemplary preliminary two-dimensional matrix 520*p*, a few assumptions are made: the detector 430 is at the focal plane of the output lens 464; the fringe pattern 474 is centered laterally on the detector 430; and a center GC of the fringe pattern 474 lies on the detector 430. It is not necessary for the center GC of the fringe pattern 474 to lie on the detector 430.

Referring to FIG. 6A, the relationship between the optical spectrum 107, the preliminary two-dimensional matrix 520*p*, and the fringe pattern 571 is shown and can be represented by matrix multiplication. The mathematical representation between the amplitude F of the fringe pattern 571 at the spatial area 435(*m*) can be written as follows:

$$Fm = \sum_{k=1}^{j} A(m,k)S(\lambda k),$$

where S(λk) is the spectral intensity 550 (determined from the optical spectrum 107) at a wavelength λ 555 equal to λk, and A(m,k) is the mapping (determined from the matrix 520*p*) between the wavelength λk and the spatial area 435(*m*). This equation is a discretized version of a Fredholm integral equation of the first kind. In terms of matrix multiplication, this equation can be written more simply as: F=A×Sp, where F is the fringe pattern 571, A is the matrix 520*p*, and Sp is the optical spectrum 107. In FIG. 6A, for simplicity, only the contour lines having maximum values are shown.

An example of a matrix A 520*p* for the case of an etalon 463 that is designed as an ideal, plane-parallel etalon, the relative etalon transmission (the input-output relationship of the spectrum dispersing device 425) is given by:

$$A(R,\lambda) = I_{norm}\left[1 + \mathbb{F}\sin^2\left(\frac{2\pi nde}{\lambda\sqrt{1+\left(\frac{R}{f_D}\right)^2}}\right)\right]^{-1},$$

where $I_{norm}$ is a normalization factor, $\mathbb{F}$ is the coefficient of finesse of the etalon 463, n is the index of refraction of the material between the reflective surfaces of the flats 463A, 463B, de is the distance between the reflective surfaces of the flats 463A, 463B, R is a radial distance of the spatial area 435 and it is the distance between the spatial area 435 and the center GC of the interference pattern 474. Moreover, the detector 430 is positioned at the focal plane of the output lens 464, the focal plane is located a distance $f_D$ from the output lens 464.

In order to recover the spectrum Sp 107 from the fringe pattern 571 and the matrix A 520*p*, both sides of this equation should be multiplied by a two-dimensional matrix $A^{-1}$ 520 as follows: $A^{-1}\times F = A^{-1} \times A \times Sp \approx 1 \times Sp$, where the two-dimensional matrix 520 is a pseudoinverse of the preliminary two-dimensional matrix 520*p*. Accordingly, the spectrum Sp 107 is given by this matrix relationship: $Sp \approx A^{-1} \times F$. FIG. 6B shows this relationship in matrix form. The two-dimensional matrix $A^{-1}$ 520 represented in FIG. 6B can include more structure than what is shown and only the contour lines of maximum values are shown for simplicity. The calculation of the two-dimensional matrix $A^{-1}$ 520 is discussed in greater detail below, after the other aspects of the metrology system 100 and the photolithography system 210 are described.

In some implementations, the two-dimensional matrix 520 shows the mapping for one free spectral range FSR of the etalon 463. That is, the range of distinct spectral features 556 used in the two-dimensional matrix 520 spans one free spectral range FSR of the etalon 463. The resulting matrix A 520*p* produced from one FSR of the etalon 463 can be used to recover information from other wavelengths and free spectral ranges, so that the measurement over just one FSR suffices for a general spectral recovery.

As discussed above, the light beams formed from the interaction of the light beam 110' with the etalon 463 optically interfere with each other. Where these light beams exit in phase with each other, then the output of the etalon 463 is an interference maximum, and where these light beams exit out of phase with each other, then the output of the etalon 463 is an interference minimum. The result is the circular fringe pattern 474 shown in FIG. 4A. The free spectral range FSR of the etalon 463 is the spacing in wavelength (or optical frequency) between two successive transmitted optical intensity maxima (or minima). The FSR is the amount by which the wavelength of the light beam 110' must be tuned to exactly reproduce the original fringe pattern. In one example, the FSR of the etalon 463 is 3 picometers (pm).

Figure 7:
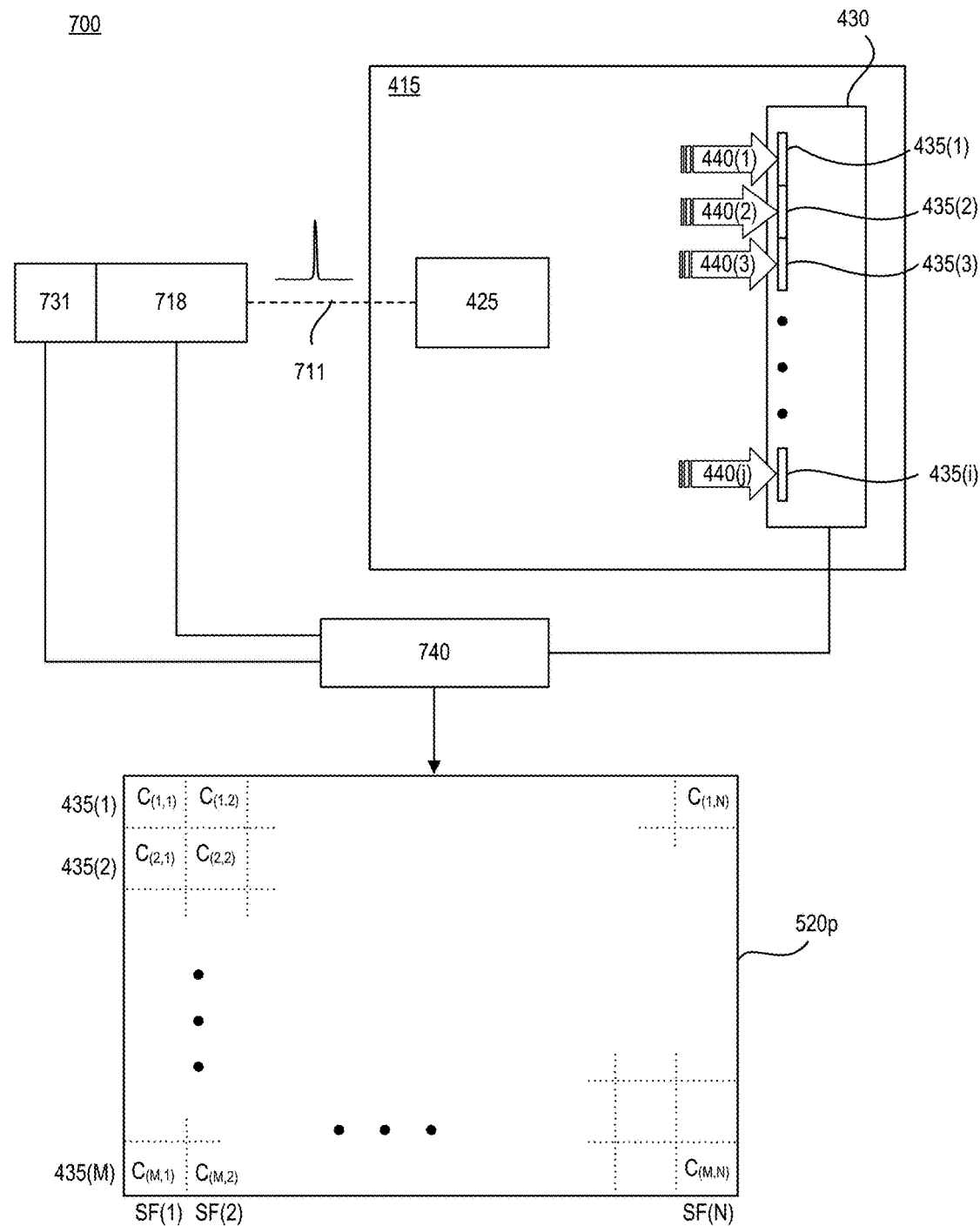
FIG. 7 is a block diagram of an exemplary test apparatus used to determine the two-dimensional matrix for the spectrometer of FIG. 1 or 4.

Moreover, before the two-dimensional matrix $A^{-1}$ 520 can be calculated, the preliminary two-dimensional matrix A 520p for the spectrometer 415 must be determined. Referring to FIG. 7, a test apparatus 700 is used to determine the preliminary two-dimensional matrix A 520p for the spectrometer 415. The test apparatus 700 can be used to determine the preliminary two-dimensional matrix A 120p for any spectrometer 115.

The test apparatus 700 includes a test light source 718 configured to produce a test light beam 711 and a spectral feature apparatus 731 for controlling a spectral feature (such as a wavelength) of the test light beam 711. A test control module 740 is connected to the spectral feature apparatus 731 and the detector 430. The test light beam 711 interacts with the spectrometer 415 in a manner that is controlled by the test control module 740, and the test control module 740 receives the output from the detector 430 to build the preliminary two-dimensional matrix A 520p.

In some implementations, the test light source 718 is a tunable laser of wavelength that can be changed across the spectral range of interest. For example, the test light source 718 can be a single frequency all solid-state laser. The test light beam 711 produced by the test light source 718 can be considered as a quasi-monochromatic light beam relative to the light beam 110'. This means that the bandwidth of the test light beam 711 is much less than the bandwidth of the light beam 110'. For example, the bandwidth of the test light beam 711 can be as large as 20% of the bandwidth of the light beam 110'. A typical range of the bandwidth of the test light beam 711 is that it is between 5-500,000 times smaller than the bandwidth of the light beam 110'.

The spectral feature apparatus 731 is controlled by the test control module 740 to change or select a spectral feature (such as the wavelength) of the test light beam 711 across a range of spectral features that correspond to the range of spectral features of the optical spectrum 107 of the light beam 110'. This is performed while the test light beam 711 is interacting with the spectrometer 415, while the detector 430 is recording the characteristic of the test light beam 711 projected at each distinct spatial area 435(1), 435(2), etc., and while the test control module 740 receives and stores the values of the recorded characteristic from the detector 430. For example, if the test light source 718 is a semiconductor laser such as a laser diode, then the spectral feature apparatus 731 can be a temperature controller that changes the temperature of the laser diode. As another example, if the test light source 718 is a laser diode, then the spectral feature apparatus 731 can be a current controller that controls the current to the semiconductor diode. As another example, the spectral feature apparatus 731 can be a mechanical orientation of an optical feedback mechanism such as a diffraction grating, or the optics steering the test light beam onto the diffraction grating.

A detailed description of photolithography system 210 is provided next, before discussing the operation of the metrology apparatus 100 and the test apparatus 700.

Figure 8:
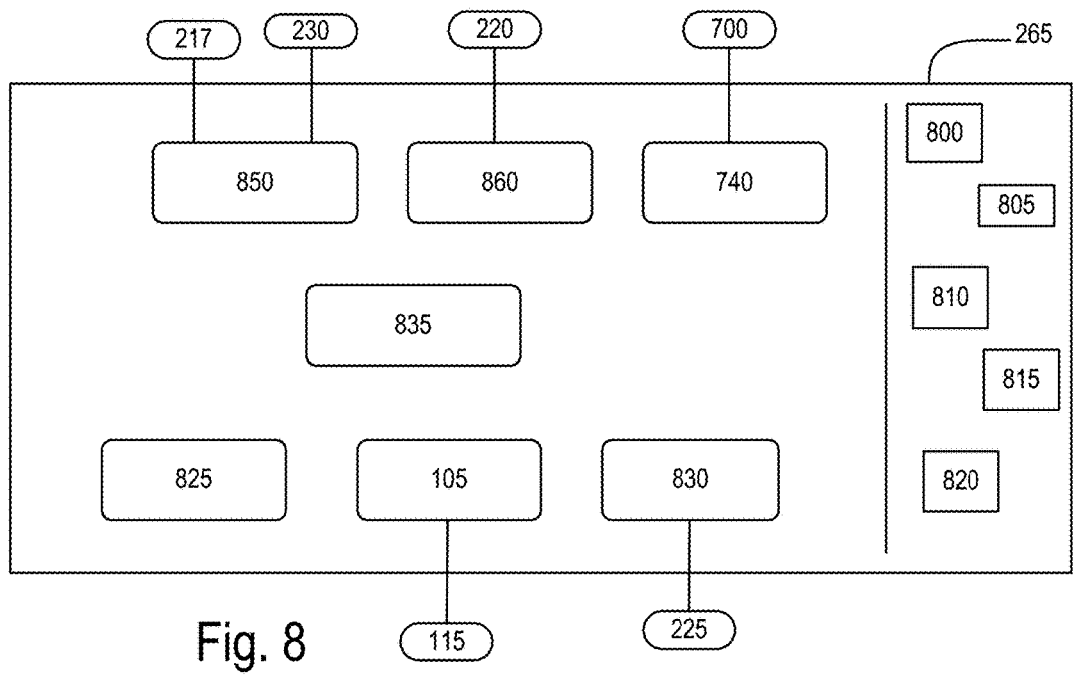
FIG. 8 is a block diagram of an exemplary control system of the photolithography system of FIG. 2.

Referring to FIG. 8, details about the control system 265 are provided that relate to the aspects of the system and method described herein. The control system 265 can include other features not shown in FIG. 8. In general, the control system 265 includes one or more of digital electronic circuitry, computer hardware, firmware, and software.

The control system 265 includes memory 800, which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. As discussed above, in some implementations, the matrix 120 is stored within memory 800. The control system 265 can also include one or more input devices 805 (such as a keyboard, touch screen, microphone, mouse, hand-held input device, etc.) and one or more output devices 810 (such as a speaker or a monitor).

The control system 265 includes one or more programmable processors 815, and one or more computer program products 820 tangibly embodied in a machine-readable storage device for execution by a programmable processor (such as the processors 815). The one or more programmable processors 815 can each execute a program of instructions to perform desired functions by operating on input data and generating appropriate output. Generally, the processor 815 receives instructions and data from memory 800. Any of the foregoing may be supplemented by, or incorporated in, specially designed ASICs (application-specific integrated circuits).

The control system 265 includes, among other components, a spectral feature module 825, a lithography module 830, a decision module 835, the test control module 740, a light source module 850, and a beam module 860. Each of these modules can be a set of computer program products executed by one or more processors such as the processors 815. Moreover, any of the modules 825, 830, 835, 740, 850, 860 can access data stored within the memory 800.

The spectral feature module 825 receives the output from the metrology control module 105 and determines whether one or more spectral features are out of an acceptable range of spectral features. The test control module 740 interfaces with the test apparatus 700 and therefore controls the operation of the test light source 718. The test control module 740 uses the output from the spectrometer 115 as well as the information about how the test light source 718 is controlled to create the matrix 120. The lithography module 830 receives information from the lithography controller 225 of the photolithography exposure apparatus 205. The light source module 850 is connected to one or more of the optical source 217 and the spectral feature selection apparatus 230. The beam module 860 is connected to one or more components of the beam preparation system 220. Connections between modules within the control system 265 and between modules within the control system 265 and other components of the photolithography system 210 can be wired or wireless. The decision module 835 receives outputs from one or more of the other modules (such as the modules 825 and 830) and determines which module or modules (such as the test control module 740, the beam module 860 or the light source module 850) need to be activated.

While only a few modules are shown in FIG. 8, it is possible for the control system 265 to include other modules. Additionally, although the control system 265 is represented as a box in which all of the components appear to be co-located, it is possible for the control system 265 to be made up of components that are physically remote from each other in space or time. For example, the light source module 850 can be physically co-located with the optical source 217 or the spectral feature selection apparatus 230.

As another example, the test control module 740 can be physically co-located with the test apparatus 700 and can be separate from the other components of the control system 265 in space and time.

In general, the control system 265 receives at least some information about the light beam 110 from the metrology apparatus 100, and the spectral feature module 825 performs an analysis on the information to determine how to adjust one or more spectral features (for example, the bandwidth) of the light beam 110 supplied to the photolithography exposure apparatus 205. Based on this determination, the control system 265 sends signals to the spectral feature selection apparatus 230 and/or the optical source 217 to control operation of the optical source 217 via the control module 850. In general, the spectral feature module 825 performs the analysis needed to estimate one or more spectral features (for example, the wavelength and/or the bandwidth) of the light beam 110. The output of the spectral feature module 825 is an estimated value of the spectral feature that is sent to the decision module 835.

The spectral feature module 825 includes a comparison block connected to receive the estimated spectral feature and also connected to receive a spectral feature target value. In general, the comparison block outputs a spectral feature error value that represents a difference between the spectral feature target value and the estimated value. The decision module 835 receives the spectral feature error value and determines how best to effect a correction to the system 210 in order to adjust the spectral feature. Thus, the decision module 835 sends a signal to the light source module 850, which determines how to adjust the spectral feature selection apparatus 230 (or the optical source 217) based on the spectral feature error value. The output of the light source module 850 includes a set of actuator commands that are sent to the spectral feature selection apparatus 230. For example, the light source module 850 sends the commands to control module of the spectral feature selection apparatus 230, and that control module is connected to the actuation systems within the apparatus 230.

Additionally, the lithography module 830 can receive instructions from the lithography controller 225 of the photolithography exposure apparatus 205 for example, to change one or more spectral features of the pulsed light beam 110 or to change a pulse repetition rate of the light beam 110. The lithography module 830 performs an analysis on these instructions to determine how to adjust the spectral features and sends the results of the analysis to the decision module 835. The control system 265 causes the optical source 217 to operate at a given repetition rate, which is the rate at which the pulses are produced. More specifically, the photolithography exposure apparatus 205 sends a trigger signal to the optical source 217 (by way of the control system (through the lithography module 830) for every pulse (that is, on a pulse-to-pulse basis) and the time interval between those trigger signals can be arbitrary, but when the photolithography exposure apparatus 205 sends trigger signals at regular intervals then the rate of those signals is a repetition rate. The repetition rate can be a rate requested by the photolithography exposure apparatus 205.

Figure 9:
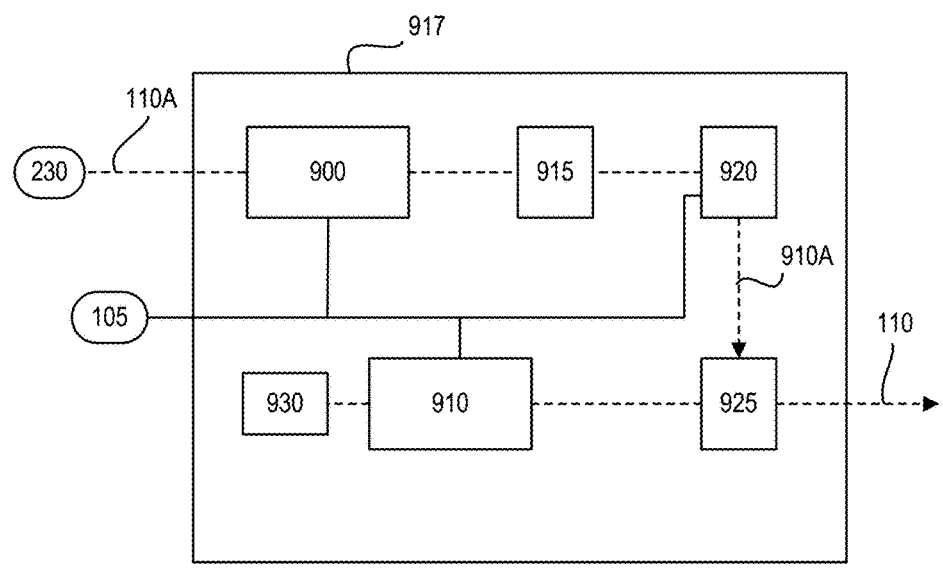
FIG. 9 is a block diagram of an exemplary optical source for producing the light beam.

Referring to FIG. 9, in some implementations, the optical source 217 is an exemplary optical source 917. The optical source 917 is a pulsed laser source that produces a pulsed laser beam as the light beam 110. The optical source 917 is a two-stage laser system that includes a master oscillator (MO) 900 that provides a seed light beam 910A to a power amplifier (PA) 910. The master oscillator 900 typically includes a gain medium in which amplification occurs and an optical feedback mechanism such as an optical resonator. The power amplifier 910 typically includes a gain medium in which amplification occurs when seeded with the seed laser beam 910A from the master oscillator 900. The power amplifier 910 can be a power ring amplifier (PRA), which is designed as a regenerative ring resonator. In this case, enough optical feedback can be provided from the ring design. The spectral feature selection apparatus 230 receives the light beam 110A from the master oscillator 900 to enable fine tuning of spectral features such as the center wavelength and the bandwidth of the light beam 110A at relatively low output pulse energies. The power amplifier 910 receives the seed light beam 910A from the master oscillator 900 and amplifies this output to attain the necessary power for output to use in photolithography.

In some implementations, the master oscillator 900 includes a discharge chamber having two elongated electrodes, a laser gas that serves as the gain medium, and a fan circulating the gas between the electrodes. A laser resonator is formed between the spectral feature selection apparatus 230 on one side of the discharge chamber, and an output coupler 915 on a second side of the discharge chamber to output the seed light beam 910A to the power amplifier 910.

In other implementations, the master oscillator 900 includes as the gain medium, a solid state material. Solid state media that can be used include crystals or glasses doped with rare earth or transition metal ions, or semiconductor lasers. A master oscillator 900 using a solid state gain medium generates the seed light beam 910A. The solid state gain medium can be optically pumped with a flash lamp or an arc lamp, or using a laser diode or a titanium (Ti) sapphire (Ti:Sapphire) laser. An exemplary solid state gain medium can be neodymium-doped yttrium aluminum garnet (Nd:YAG), neodymium doped yttrium lithium fluoride (Nd:YLF), or Ti:Sapphire. A solid state gain medium is capable of producing a single mode output, which is highly temporally (and spatially) coherent and also has a narrow bandwidth. The seed light beam 910A that is output from the solid state gain medium of the master oscillator 900 may be at a wavelength that is not the desired wavelength (for example, it could be outside of the DUV wavelength range). In this case, the seed light beam 910A can be directed through one or more wavelength conversion elements in order to ensure that the wavelength of the seed light beam 910A directed to the power amplifier 910 is at the desired DUV wavelength. For example, if the seed light beam 910A output from the solid state gain medium within the master oscillator 900 is at a wavelength of about 773.6 nm (for example, as would be for a Ti:Sapphire gain medium), then the seed light beam 910A could be directed through two wavelength conversion elements to convert the wavelength to about 193.4 nm. The wavelength conversion element or elements can use a non-linear optics technique, such as sum frequency generation, to convert the wavelength into the desired wavelength.

The optical source 917 can also include a metrology module (such as a line center analysis module or LAM) 920 that receives an output from the output coupler 915, and one or more beam modification optical systems 925 that modify the size and/or shape of the beam as needed. The metrology module 920 is an example of type of measurement system that can be used to measure the wavelength (for example, the center wavelength) of the seed light beam. In some implementations, the metrology apparatus 100 could function as the metrology module 920. In these implementations, the light beam 110' is a light beam that is separated out from the seed light beam 910A.

The power amplifier 910 includes a power amplifier discharge chamber, and if it is a regenerative ring amplifier, the power amplifier also includes a beam reflector or beam turning device 930 that reflects the light beam back into the discharge chamber to form a circulating path. The power amplifier discharge chamber includes a pair of elongated electrodes, a laser gas that serves as the gain medium, and a fan for circulating the gas between the electrodes. The seed light beam 910A is amplified by repeatedly passing through the power amplifier 910. The beam modification optical system 925 provides a way (for example, a partially-reflecting mirror) to in-couple the seed light beam 910A and to out-couple a portion of the amplified radiation from the power amplifier to form the output light beam 110.

The laser gas used in the discharge chambers of the master oscillator 900 and the power amplifier 910 can be any suitable gas for producing a laser beam around the required wavelengths and bandwidth. For example, the laser gas can be argon fluoride (ArF), which emits light at a wavelength of about 193 nm, or krypton fluoride (KrF), which emits light at a wavelength of about 248 nm.

The metrology module 920 monitors the wavelength (for example, the peak wavelength) of the output (the light beam 910A) of the master oscillator 900. The metrology module 920 can be placed at other locations within the optical source 217. Moreover, the metrology apparatus 100 can be placed at the output of the power amplifier 910, either before or after one or more of the beam modification optical systems 925.

The repetition rate of the pulses produced by the power amplifier 910 is determined by the repetition rate at which the master oscillator 900 is controlled by the control system 265, under the instructions from the controller 225 in the photolithography exposure apparatus 205. The repetition rate of the pulses output from the power amplifier 910 is the repetition rate seen by the photolithography exposure apparatus 205.

As discussed above, it is possible to control the bandwidth both coarsely and finely using only optical elements. On the other hand, it is possible to control the bandwidth in a fine and narrow range, and rapidly, by controlling a differential timing between the activation of the electrodes within the master oscillator 900 and the power amplifier 910 while controlling the bandwidth in a coarse and wide range by adjusting the angle of a prism within the spectral feature selection system 230.

Figure 10:
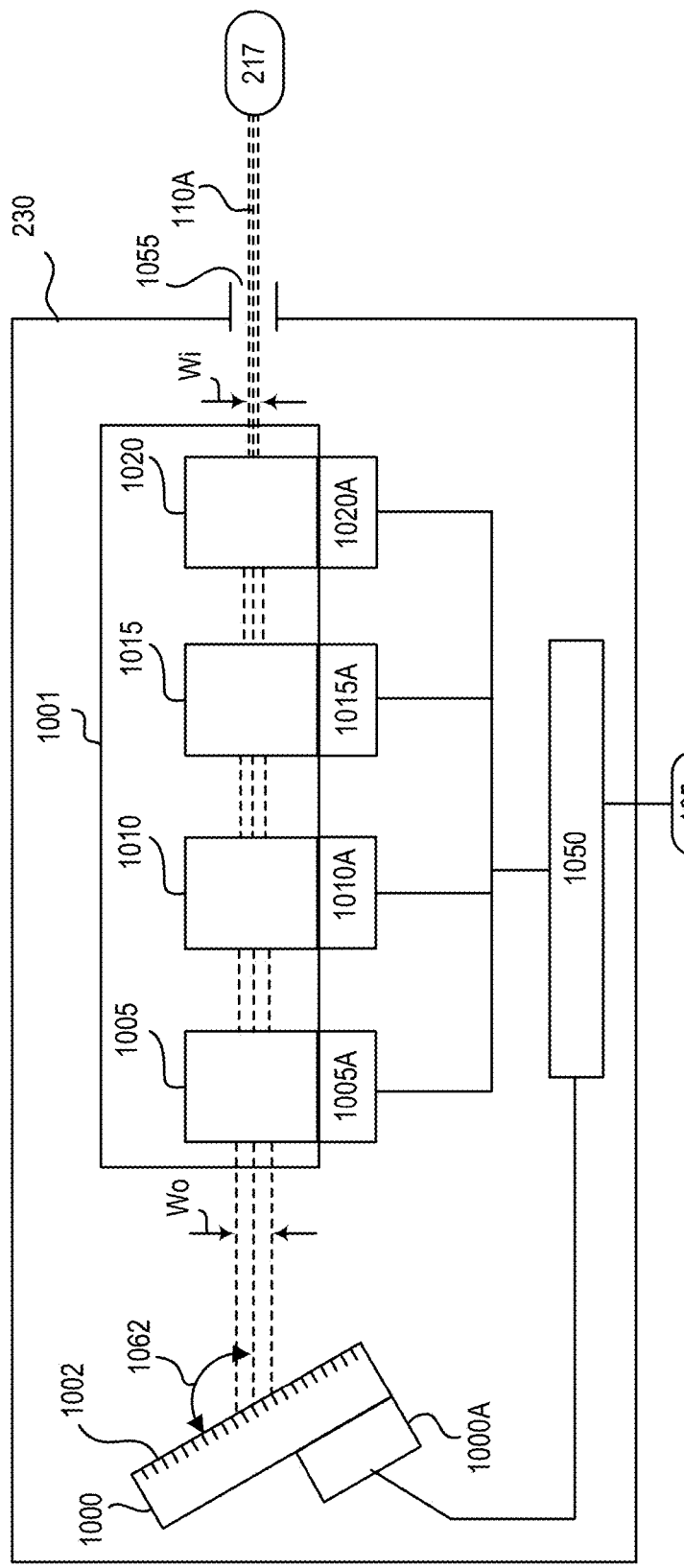
FIG. 10 is a block diagram of an exemplary spectral feature selection apparatus for controlling one or more spectral features of the light beam.

Referring to FIG. 10, in some implementations, the spectral feature selection apparatus 230 includes a set of optical features or components 1000, 1005, 1010, 1015, 1020 arranged to optically interact with the pulsed light beam 110A and a control module 1050 that includes electronics in the form of any combination of firmware and software. The optical components 1000, 1005, 1010, 1015, 1020 can be configured to provide a coarse spectral feature adjustment system; and, if the adjustment of such components is rapid enough, it can be configured to provide a fine spectral feature adjustment system. Although not shown in FIG. 10, it is possible for the spectral feature selection apparatus 230 to include other optical features or other non-optical features for providing fine spectral feature control.

The control module 1050 is connected to one or more actuation systems 1000A, 1005A, 1010A, 1015A, 1020A physically coupled to respective optical components 1000, 1005, 1010, 1015, 1020. The optical components of the apparatus 230 include a dispersive optical element 2000, which can be a grating, and a beam expander 1001 made of a set of refractive optical elements 1005, 1010, 1015, 1020, which can be prisms. The grating 1000 can be a reflective grating that is designed to disperse and reflect the light beam 110A; accordingly, the grating 1000 is made of a material that is suitable for interacting with a pulsed light beam 110A having a wavelength in the DUV range. Each of the prisms 1005, 1010, 1015, 1020 is a transmissive prism that acts to disperse and redirect the light beam 110A as it passes through the body of the prism. Each of the prisms can be made of a material (such as, for example, calcium fluoride) that permits the transmission of the wavelength of the light beam 110A. Although four refractive optical elements 1005, 1010, 1015, 1020 are shown, it is possible for fewer than four or more than four to be used in the beam expander 1001.

The pulsed light beam 110A enters the apparatus 230 through an aperture 1055, and then travels through the prism 1020, the prism 1010, and the prism 1005, in that order, prior to impinging upon a diffractive surface 1002 of the grating 1000. With each passing of the beam 110A through a consecutive prism 1020, 1015, 1010, 1005, the light beam 110A is optically magnified and redirected (refracted at an angle) toward the next optical component. The light beam 110A is diffracted and reflected from the grating 1000 back through the prism 1005, the prism 1010, the prism 1015, and the prism 1020, in that order, prior to passing through the aperture 1055 as the light beam 110A exits the apparatus 230.

The rotation of a prism (which can be any one of prisms 1005, 1010, 1015, 1020) of the beam expander 1001 changes an angle of incidence at which the light beam 110A impinges upon the entrance surface of that rotated prism. Moreover, two local optical qualities, namely, an optical magnification and a beam refraction angle, of the light beam 110A through that rotated prism are functions of the angle of incidence of the light beam 110A impinging upon the entrance surface of that rotated prism. The optical magnification of the light beam 110A through the prism is the ratio of a transverse width of the light beam 110A exiting that prism to a transverse width of the light beam 110A entering that prism.

A change in the local optical magnification of the light beam 110A at one or more of the prisms within the beam expander 1001 causes an overall change in the optical magnification OM 1065 of the light beam 110A through the beam expander 1001. The optical magnification OM 1065 of the light beam 110A through the beam expander 1001 is the ratio of the transverse width Wo of the light beam 110A exiting the beam expander 1001 to a transverse width Wi of the light beam 110A entering the beam expander 1001. Additionally, a change in the local beam refraction angle through one or more of the prisms within the beam expander 1001 causes an overall change in an angle of incidence of 1062 of the light beam 110A at the surface 1002 of the grating 1000.

The wavelength of the light beam 110A can be adjusted by changing the angle of incidence 1062 at which the light beam 110A impinges upon the diffractive surface 1002 of the grating 1000. The bandwidth of the light beam 110A can be adjusted by changing the optical magnification 1065 of the light beam 110.

The apparatus 230 is designed to adjust the wavelength of the light beam 110A that is produced within the resonator or resonators of the optical source 217 by adjusting an angle 1062 of incidence of at which the light beam 110A impinges upon the diffractive surface 1002 of the grating 1000. Specifically, this can be done by rotating one or more of the prisms 1005, 1010, 1015, 1020 and the grating 1000 to thereby adjust the angle of incidence 1062 of the light beam 110A.

Moreover, the bandwidth of the light beam 110A that is produced by the optical source 217 is adjusted by adjusting the optical magnification OM 1065 of the light beam 110A. Thus, the bandwidth of the light beam 110A can be adjusted by rotating one or more of the prisms 1005, 1010, 1015, 1020, which causes the optical magnification 1065 of the light beam 110A to change. Because the rotation of a particular prism causes a change in both the local beam refraction angle and the local optical magnification at that prism, the control of wavelength and bandwidth are coupled in this design.

Additionally, the bandwidth of the light beam 110A is relatively sensitive to the rotation of the prism 1020 and relatively insensitive to rotation of the prism 1005. This is because any change in the local optical magnification of the light beam 110A due to the rotation of the prism 1020 is multiplied by the product of the change in the optical magnification in the other prisms 1015, 1010, and 1005 because those prisms are between the rotated prism 1020 and the grating 1000, and the light beam 110A must travel through these other prisms 1015, 1010, 1005 after passing through the prism 1020. On the other hand, the wavelength of the light beam 110A is relatively sensitive to the rotation of the prism 1005 and relatively insensitive to the rotation of the prism 1020. For example, in order to change the bandwidth without changing the wavelength, the optical magnification 1065 should be changed without changing the angle of incidence 1062, and this can be achieved by rotating the prism 1020 by a large amount and rotating the prism 1005 by a small amount.

The control module 1050 is connected to one or more actuation systems 1000A, 1005A, 1010A, 1015A, 1020A that are physically coupled to respective optical components 1000, 1005, 1010, 1015, 1020. Although an actuation system is shown for each of the optical components it is possible that some of the optical components in the apparatus 230 are either kept stationary or are not physically coupled to an actuation system. For example, in some implementations, the grating 1000 can be kept stationary and the prism 1015 can be kept stationary and not physically coupled to an actuation system.

Each of the actuation systems 1000A, 1005A, 1010A, 1015A, 1020A includes one or more actuators that are connected to its respective optical components. The adjustment of the optical components causes the adjustment in the particular spectral features (the wavelength and/or bandwidth) of the light beam 110A. The control module 1050 receives a control signal from the control system 265, the control signal including specific commands to operate or control one or more of the actuation systems. The actuation systems can be selected and designed to work cooperatively.

Each of the actuators of the actuation systems 1000A, 1005A, 1010A, 1015A, 1020A is a mechanical device for moving or controlling the respective optical component. The actuators receive energy from the module 1050, and convert that energy into some kind of motion imparted to the respective optical component. For example, the actuation systems can be any one of force devices and rotation stages for rotating one or more of prisms of a beam expander. The actuation systems can include, for example, motors such as stepper motors, valves, pressure-controlled devices, piezoelectric devices, linear motors, hydraulic actuators, voice coils, etc.

The grating 1000 can be a high blaze angle Echelle grating, and the light beam 110A incident on the grating 1000 at any angle of incidence 1062 that satisfies a grating equation will be reflected (diffracted). The grating equation provides the relationship between the spectral order of the grating 1000, the diffracted wavelength (the wavelength of the diffracted beam), the angle of incidence 1062 of the light beam 110A onto the grating 1000, the angle of exit of the light beam 110A diffracted off the grating 1000, the vertical divergence of the light beam 110A incident onto the grating 1000, and the groove spacing of the diffractive surface of the grating 1000. Moreover, if the grating 1000 is used such that the angle of incidence 1062 of the light beam 110A onto the grating 1000 is equal to the angle of exit of the light beam 110A from the grating 1000, then the grating 1000 and the beam expander (the prisms 1005, 1010, 1015, 1020) are arranged in a Littrow configuration and the wavelength of the light beam 110A reflected from the grating 1000 is the Littrow wavelength. It can be assumed that the vertical divergence of the light beam 110A incident onto the grating 1000 is near zero. To reflect the nominal wavelength, the grating 1000 is aligned, with respect to the light beam 110A incident onto the grating 1000, so that the nominal wavelength is reflected back through the beam expander (the prisms 1005, 1010, 1015, 1020) to be amplified in the optical source 217. The Littrow wavelength can then be tuned over the entire gain bandwidth of the resonators within optical source 217 by varying the angle of incidence 1062 of the light beam 110A onto the grating 1000.

Each of the prisms 1005, 1010, 1015, 1020 is wide enough along the transverse direction of the light beam 110A so that the light beam 110A is contained within the surface at which it passes. Each prism optically magnifies the light beam 110A on the path toward the grating 1000 from the aperture 1055, and therefore each prism is successively larger in size from the prism 1020 to the prism 1005. Thus, the prism 1005 is larger than the prism 1010, which is larger than the prism 1015, and the prism 1020 is the smallest prism. The wavelength can be coarsely changed by rotating the prism 1005, and the prism 1020 can be rotated (in a coarse manner). The angle of incidence 1062 of the light beam 110A is changed due to the rotation of the prism 1005 and the rotation of the prism 1020 offsets the change in magnification caused by the rotation of the prism 1005. The prism 1020 can be used for coarse, large range, and slow bandwidth control. By contrast, the bandwidth can be controlled in a fine and narrow range and even more rapidly by controlling the prism 1010.

Figure 11:
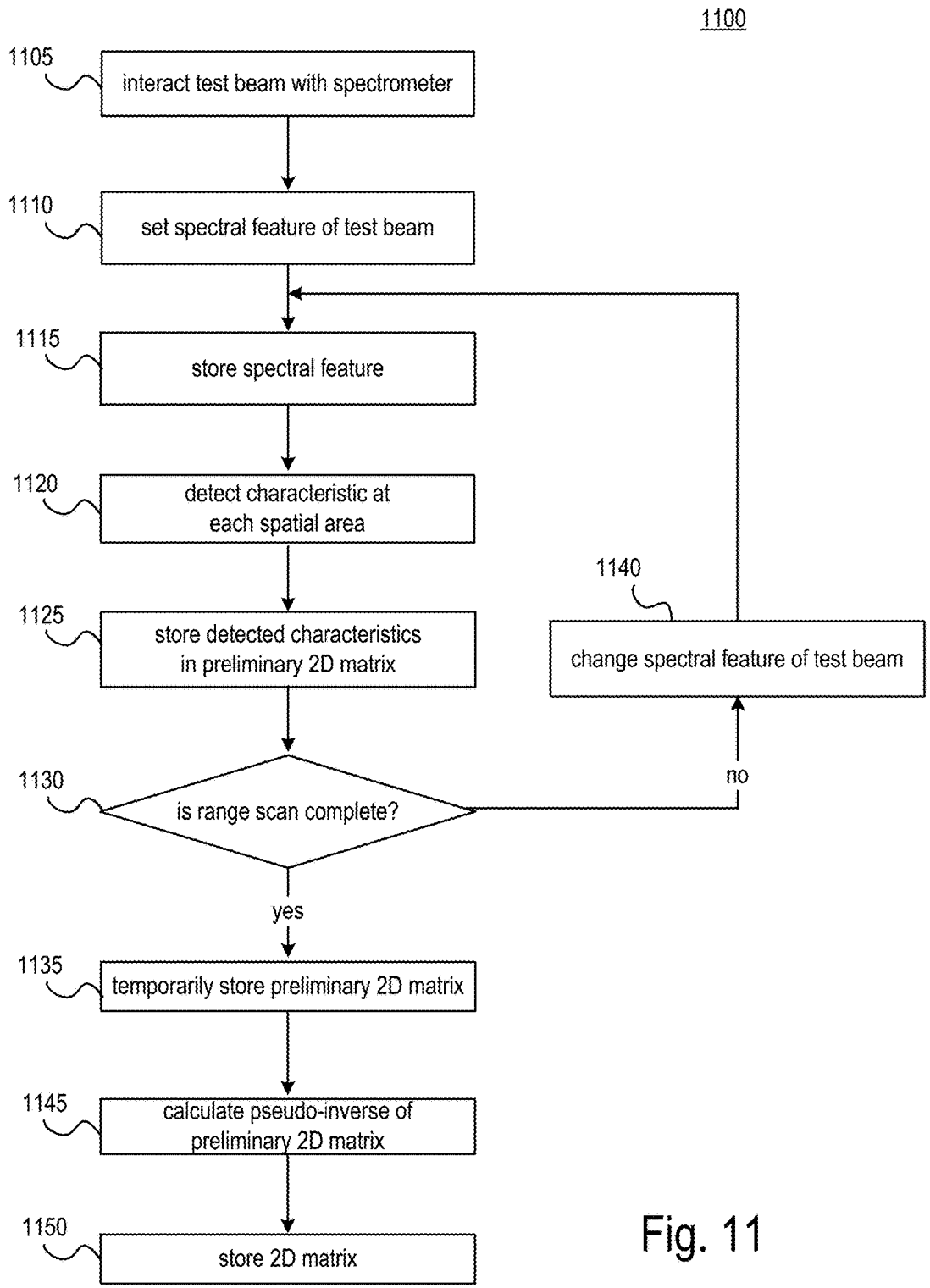
FIG. 11 is a flow chart of a procedure performed by a test control module for creating the two-dimensional matrix.

Returning to a discussion regarding the two-dimensional matrix 120, 520 and referring to FIG. 11, a procedure 1100 is performed by the control system 265 (and specifically the test control module 740) for creating the two-dimensional matrix 120 or 520. Once the two-dimensional matrix 120 or 520 is created, it can be stored within memory 800 and used by the other components such as the metrology control module 105 of the control system 265. Specifically, the two-dimensional matrix 120, 520 is calculated based on the preliminary two-dimensional matrix 520$p$, and each column of the preliminary two-dimensional matrix 520$p$ represents the output of the spectrometer 115 or 415, respectively, for a given, monochromatic input optical spectrum. Thus, in practice, it is possible to measure or create the preliminary two-dimensional matrix 520$p$ by illuminating the spectrum dispersing device 125 or 425 with a tunable, narrow-linewidth laser of a specific wavelength in the range of the spectrum dispersing device 125 or 425 and then scanning or incrementing the wavelength in even steps over the spectral range of interest. Each step in this scan yield a fringe corresponding to that step number, and that fringe is the jth column of the matrix 520$p$.

Reference is also made to FIG. 7 when describing the procedure 1100. The test light beam 711 is optically interacted with the spectrometer 415 (1105). The test control module 740 outputs an electrical signal to the test light source 718 to pump the laser gain medium and output the test light beam 711. Moreover, the test light beam 711 is directed to the spectrometer 415 using appropriate optical components. The test light beam 711 is directed to the etalon apparatus 425, where it is separated into different filtered versions 440(1), 440(2), etc. of the optical spectrum 107, and each spatial area 435(1), 435(2), etc. of the detector 430 receives a different filtered version 440(1), 440(2), etc.

The spectral feature (such as the wavelength) of the test light beam 711 is set to a value that is within the range of values at which the light beam 110' operates (1110). The wavelength of the test light beam 711 can be set and then controlled by the test control module 740, which can output an electrical signal to the spectral feature apparatus 731 that controls the wavelength of the test light beam 711. This value of the spectral feature that is set is stored (1115). For example, the matrix module 855 receives the value of the spectral feature from the test control module 740, and stores this value in memory 800 of the control system 265 for future reference. With reference to FIG. 7, at the beginning of the procedure 1100, the first spectral feature SF(1) is stored and corresponds to the first column of the preliminary two-dimensional matrix 520p. The number of columns N of this exemplary preliminary two-dimensional matrix 520p corresponds to the total number of spectral features SF(N) that are being probed during the procedure 1100, and this number of probed spectral features correspond to the number of points at which the recovered optical spectrum is to be sampled, given that the recovered optical spectrum can fall anywhere within a 1-FSR interval.

The characteristic of the test light beam 711 is detected at each spatial area 435(1), 435(2), etc. of the spectrometer 415 (1120). If the total number of spatial areas 435(1), 435(2), etc. is M (which means that i is M), then the characteristic of the test light beam 711 is detected at M number of spatial areas. With reference to FIG. 7, the characteristic C(1,1) is detected at the first spatial area 435(1), the characteristic C(2,1) is detected at the second spatial area 435(2), and the characteristic C(M,1) is detected at the last spatial area 435(M).

The detected characteristics C at each spatial area 435(1), 435(2), ... 435(M) are stored as a column in the preliminary two-dimensional matrix 520p (1125). The column that is assigned for storage is based on the value of the spectral feature of the test light beam 711 (which had been stored at step 1115). For example, the test control module 740 receives the values of the characteristic C from the detector 430 and stores these values of the characteristic C in memory 800 of the control system 265. If the spectral feature SF is the first spectral feature SF(1) in the range, then the characteristics C(1,1), C(2,1), ... C(M,1) are stored as the first column in the preliminary two-dimensional matrix 520p.

The test control module 740 determines whether all spectral features SF of the test light beam 711 have interacted with the spectrometer 415 (1130). Thus, using the example of FIG. 7, the test control module 740 determines whether all N spectral features SF have interacted with the spectrometer 415. If all N spectral features SF have interacted with the spectrometer 415, then the preliminary two-dimensional matrix 520p is complete, and the entire preliminary two-dimensional matrix 520p is stored (1135) in memory (such as memory 800) for future use, and for access by the metrology control module 105.

If not all N spectral features SF have interacted with the spectrometer 415 (1130), then the preliminary two-dimensional matrix 520p is not complete, and the spectral feature SF of the test light beam 711 is changed to the next value in the range of possible values (1140) and then the procedure 1100 continues as discussed above. The wavelength of the test light beam 711 can be adjusted under control of the test control module 740, which adjusts the electrical signal sent to the spectral feature apparatus 731 to thereby change the wavelength of the test light beam 711. The matrix module 855 receives the new value of the spectral feature from the test control module 740, and stores this value in memory 800 of the control system 265 (1115). With reference to FIG. 7, if the last value of the spectral feature SF was the first spectral feature SF(1), then the new value of the spectral feature SF is the second spectral feature SF(2) which corresponds to the second column of the preliminary two-dimensional matrix 520p. The steps 1115, 1120, 1125, 1130 are performed until the characteristics C(1,N), C(2,N), ... C(M,N) are stored as the last column in the matrix preliminary two-dimensional 520p (or 120).

Next, the two-dimensional matrix 520 is calculated based on the preliminary two-dimensional matrix A 520p (1145). For example, the two-dimensional matrix $A^{-I}$ 520 can be calculated as the pseudoinverse of the preliminary two-dimensional matrix A 520p (1145), as discussed next. Because the preliminary two-dimensional matrix A 520p is usually singular or close to singular, an inverse matrix $A^{-1}$ may not exist in a strict sense. In general, the pseudoinverse two-dimensional matrix $A^{-I}$ 520 is an inverse $A^{-1}$ in the limiting circumstance in which the etalon 463 has a high or infinite finesse. Because this limiting circumstance is not typical, the pseudoinverse two-dimensional matrix $A^{-I}$ 520 cannot be calculated using simple theory and a special mathematical theory should be used.

In one implementation, singular-value decomposition is used to determine the pseudoinverse two-dimensional matrix $A^{-I}$ 520. There exists a factorization, called a singular-value decomposition, of the preliminary two-dimensional matrix A 520p as follows:

$$A = U\Sigma V^T,$$

where $\Sigma$ is a diagonal matrix with non-negative real numbers on its diagonal, U is an orthogonal matrix (which means it is a square matrix with real entries and has an inverse that is equal to its conjugate transpose $U^T$), and V is an orthogonal matrix. Physically, the matrix $\Sigma$ is populated with singular values that are attenuation factors from the spectral feature (for example, wavelength) space to the spatial area space. The columns of the matrix U are left singular vectors, and provide an orthonormal basis for the spatial area space. These left singular vectors can be thought of as the letters of the spatial area language. The columns of the matrix $V^T$ are right singular vectors, and provide an orthonormal basis for the spectral feature space. These right singular vectors can be thought of as the letters of the spectral feature space language. In this implementation, the pseudoinverse two-dimensional matrix $A^{-I}$ 520 is given by:

$$A^{-I} = V\Sigma^{-1}U^T,$$

where $\Sigma^{-1}$ is the inverse of $\Sigma$. For example, if $\sigma_j$ are the singular values of the matrix $\Sigma$ and $\delta_{jk}$ is the Kronecker delta (which is a function that has the value 1 when j=k and the value 0 when j≠k), then $\Sigma^{-1}{}_{jk} = (1/\sigma_j)\delta_{jk}$.

In some implementations, the pseudoinverse two-dimensional matrix $A^{-1}$ 520 is determined using the Moore-Penrose pseudoinverse calculation.

Figure 13:
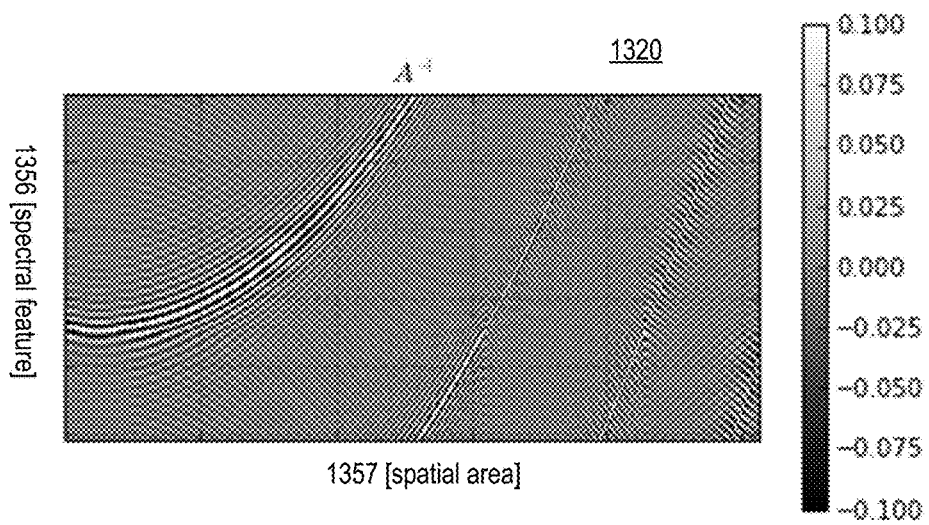
FIG. 13 is an exemplary graph showing the two-dimensional matrix of FIG. 6B that is calculated as the pseudoinverse of the preliminary two-dimensional matrix of FIG. 6A.

While FIG. 6B shows a schematic representation of the pseudoinverse two-dimensional matrix $A^{-1}$ 520, the actual pseudoinverse two-dimensional matrix $A^{-1}$ 520 is more complex. An example of a pseudoinverse two-dimensional matrix $A^{-1}$ 1320 calculated from the preliminary two-dimensional matrix A 520*p* is shown in FIG. 13. In this exemplary pseudoinverse two-dimensional matrix $A^{-1}$ 1320, the major features in dark color pick out the wavelength (spectral feature) corresponding to the fringe pattern 571 while the positive and negative oscillations (the light colored lines) indicate the generally oscillatory nature of the singular vectors into which the fringe is decomposed as part of the singular value decomposition process discussed above.

The procedure that involves singular-value decomposition to determine the pseudoinverse two-dimensional matrix $A^{-1}$ 520 is prone to noise amplification. Thus, filtering can be applied to the pseudoinverse two-dimensional matrix $A^{-1}$ 520 in order to remove noise. Filtering can be performed by replacing certain values in the matrix $\Sigma^{-1}$ with 0. The values that are replaced with 0 are chosen based on a signal-to-noise ratio of the fringe pattern 571. For example, the values $\Sigma^{-1}_{jj}$ can be replaced with 0 for j>jtrunc, where jtrunc is chosen based on the signal-to-noise ratio of the fringe pattern 571.

As another example, filtering can be performed using Tikhonov regularization technique in which $\Sigma^{-1}_{mm}$ is replaced by:

$$\Sigma'^{-1}_{jj} = \frac{\sigma_j}{\sigma_j^2 + \kappa^2} = \left(\frac{1}{\sigma_j}\right)\left[\frac{1}{1+\left(\frac{\kappa}{\sigma_j}\right)^2}\right],$$

where $\kappa$ is chosen based upon the signal-to-noise ratio of the fringe pattern 571, and $\sigma_j$ are the singular values of the matrix $\Sigma$.

Once the two-dimensional matrix $A^{-1}$ 520 is calculated (1145), then it is stored (1150), for example, in memory (such as memory 800) for future use, and access by the metrology control module 105.

Figure 12:
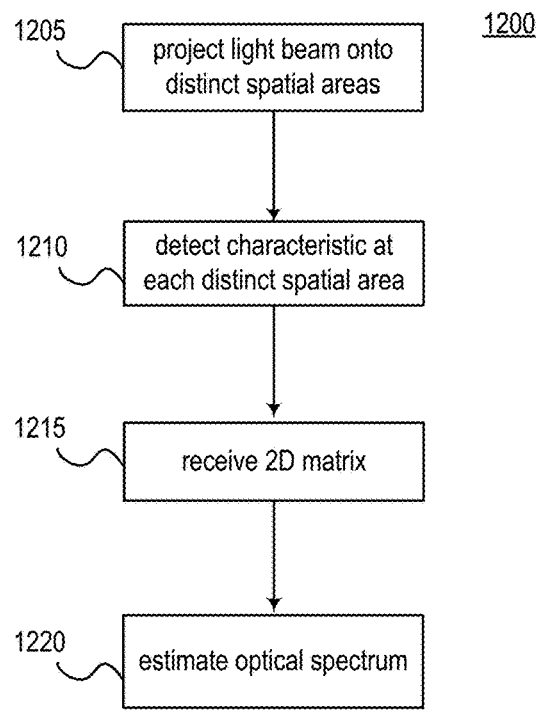
FIG. 12 is a flow chart of a procedure performed by the metrology apparatus of FIG. 1 for estimating the optical spectrum of the light beam.

Referring to FIG. 12, a procedure 1200 is performed for estimating the optical spectrum 107 of the light beam 110'. The light beam 110' is projected onto the distinct spatial areas 135(1), 135(2), . . . 135(*i*) of the spectrometer 115 such that each spatial area 135(1), 135(2), . . . 135(*i*) receives a different filtered version 140(1), 140(2), . . . 140(*j*) of the optical spectrum 107 of the light beam 110' (1205). A characteristic of the projected light beam 110' is detected at each of the spatial areas 135(1), 135(2), . . . 135(*i*) (1210). The two-dimensional matrix 120 (which was created from the procedure 1100) is received (1215), where each entry in the two-dimensional matrix 120 provides a relationship between one or more spatial areas 135(1), 135(2), . . . 135(*i*) and each spectral feature. The optical spectrum 107 is estimated (1220) based on an analysis that uses both the detected light beam characteristics (1210) and the received two-dimensional matrix 120 (1215).

The spectrum dispersing device 125 acts on the light beam 110' to project the light beam 110' onto the distinct spatial areas 135(1), 135(2), . . . 135(*i*) (1205). Moreover, the spectrum dispersing device 125 also acts to separate the different filtered versions 140(1), 140(2), . . . 140(*j*) of optical spectrum 107 of the light beam 110' to enable these different spectral filtered versions 140(1), 140(2), . . . 140(*j*) to be projected onto the distinct spatial areas (1205). The different spectral filtered versions 140(1), 140(2), . . . 140(*j*) can be projected after they are separated by the spectrum dispersing device 125 by sending each filtered version along a different direction or angle. For example, with reference to FIGS. 4A and 4B, the etalon 463 can separate the different filtered versions 140(1), 140(2), . . . 140(*j*) of the optical spectrum 107 of the light beam 110' and the output lens 464 can direct each filtered version along a different angle so that each filtered version impinges upon one of the spatial areas of the detector 430.

The characteristic of the projected light beam 110' that is detected at a spatial area 135 (1210) can be an energy of the light beam 110' deposited at that spatial area by the filtered version 140. The value of the detected characteristic can be received by the metrology control module 105. These detected characteristics can be stored within memory 800 or in a location accessible by the metrology control module 105 for future analysis. The detected characteristics can be stored within an array, where the number of rows of the array corresponds to the number of rows of distinct spatial areas of the spectrometer 115 in one spatial direction (for example, the X direction) and the number of columns of the array corresponds to the number of columns of distinct spatial areas of the spectrometer 115 in another spatial direction (for example, the Y direction). In the example shown in FIGS. 4A and 4B, the number of columns is one and the number of rows is M if the values of i and j equal M. In this example, and with reference to FIG. 7, the number of rows of the preliminary two-dimensional matrix 520*p* is also equal to M (which means that the number of columns of the two-dimensional matrix 520 is equal to M). Moreover, in the example shown in FIGS. 4A and 4B, the first spatial direction also corresponds to a radial direction while the second spatial direction can be considered to be perpendicular to the radial direction. In this example, there is only one column so the array is a one-dimensional array that is also along a radial direction in the X-Y plane.

In the example of FIG. 5, the characteristic that is detected is the energy 472, then the array of stored energies can be displayed as the fringe pattern 571, which is a plot of these detected energies 472 versus the spatial areas 435(1), 435(2), etc.

The metrology control module 105 can estimate the optical spectrum 107 (1220) based on the analysis that uses both the detected light beam characteristics (1210) and the received two-dimensional matrix 120 (1220). In some implementations, with reference to FIG. 6B, the metrology control module 105 estimates the optical spectrum 107 (1220) by performing matrix multiplication between the two-dimensional matrix $A^{-1}$ 520 and the detected light beam characteristic array, which can be in the form of the fringe pattern 571.

Various implementations of the metrology apparatus 100 and techniques for estimating the optical spectrum 107 of the light beam 110' may make minimal or reduced assumptions about the spectral shape similarity under different operating conditions of the optical source 217. Moreover the direct recovery of the optical spectrum 107 described herein can yield an estimate of the optical spectrum 107 that can enable more accurate diagnoses and can enable new metrics for estimating the bandwidth of the light beam 110'. Unlike other approaches (such as deconvolution), this metrology apparatus 100 and techniques for estimating the optical spectrum 107 can extract information not from a single fringe sliced out of the data from the detector 430 but rather from a whole fringe. Because of this, the techniques described may be more resistant to noise than correlative approaches to calculating spectral features or deconvolution approaches to estimating the optical spectrum 107.

The mapping that is provided by the two-dimensional matrix A 120 is between two different information domains; one domain is the spectral feature (wavelength) domain and the other domain is the spatial domain. This is different from a deconvolution technique that maps data from wavelength space to wavelength space. Moreover, the values within the two-dimensional matrix A 120 correspond to the detected characteristic of the light beam 110' at each spatial area and the values of the characteristic change depending on the spatial area at which the characteristic is detected. This means that the kernel of the mapping (represented by the two-dimensional matrix A 120) is not constant and depends on the location on the detector 430 at which the characteristic is detected.

Additionally, the techniques described herein provide information about changes to the wavelength that are smaller than the free spectral range (FSR) of the etalon 463; thus, different wavelengths of the light beam 110' provide optical spectra centered at different wavelength indices. This could be advantageous for bandwidth metrology in future applications that require faster tuning or adjustment of the wavelength.

In the techniques described herein, the noise of the system is broken up, not into Fourier spatial frequencies, but rather into basis singular vectors natural to the mapping between spatial area space and spectral feature space. Any noise filtering is applied in the same basis as that into which the noise components have been decomposed (in contrast to a deconvolution technique).

Such noise filtering is needed when inverting the Fredholm Integral Equations as discussed above.

Other implementations are within the scope of the following claims.

For example, in some implementations, the optical source 217 emits light in a continuous wave, rather than in a pulsed manner, as discussed above.

What is claimed is:

1. A method of estimating the optical spectrum of a light beam, the method comprising:
creating a two-dimensional matrix by interacting a test beam that is distinct from the light beam with a spectrometer, wherein the two-dimensional matrix represents the input-output relationship of the spectrometer and each entry of the two-dimensional matrix provides a relationship between one or more spatial areas of the spectrometer and a spectral feature;
projecting the light beam onto distinct spatial areas of the spectrometer, wherein each spatial area receives a different filtered version of the optical spectrum of the light beam;
detecting a characteristic of the projected light beam at each of the distinct spatial areas of the spectrometer; and
estimating the optical spectrum of the light beam based on an analysis that uses both the detected light beam characteristics and the created two-dimensional matrix.

2. The method of claim 1, wherein
projecting the light beam onto distinct spatial areas of the spectrometer comprises:
separating the different filtered versions of the optical spectrum including sending each filtered version along a different direction or a different angle, and projecting these separated filtered versions onto respective spatial areas.

3. The method of claim 1, wherein:
projecting the light beam onto distinct spatial areas of a spectrometer comprises producing a plurality of light beams that interfere with each other, and
the different filtered versions of the optical spectrum result from different optical resonances in the transmission of the spectrometer.

4. The method of claim 1, wherein detecting the characteristic of the projected light beam at the distinct spatial areas comprises detecting the intensity of the light beam along at least one radial path that extends through the projected light beam.

5. The method of claim 1, wherein detecting the characteristic of the projected light beam at the distinct spatial areas comprises detecting the energy deposited in the spatial areas by the filtered version of the optical spectrum.

6. The method of claim 1, wherein estimating the optical spectrum of the light beam comprises performing matrix multiplication between the two-dimensional matrix and the detected light beam characteristics.

7. The method of claim 1, further comprising storing the detected characteristics of the projected light beam in an array, wherein the number of rows of the array corresponds to the number of rows of distinct spatial areas of the spectrometer in one spatial direction and the number of columns of the array corresponds to the number of columns of distinct spatial areas of the spectrometer in another spatial direction.

8. The method of claim 7, wherein:
the number of columns of the array equals one and the number of rows of the array equals M; and
the number of columns of the two-dimensional matrix equals M.

9. The method of claim 1, further comprising calculating a spectral feature based on the estimated optical spectrum, wherein the spectral feature includes one or more of a wavelength and a bandwidth.

10. The method of claim 1, wherein the different filtered versions are distributions of the intensity of the light beam that have been separated based on values of the spectral feature of the light beam.

11. A method of estimating the optical spectrum of a light beam, the method comprising:
creating a two-dimensional matrix that represents an input-output relationship of a spectrometer, wherein creating comprises:
interacting a test beam with the spectrometer, the test beam being distinct from the light beam;
changing a spectral feature of the test beam across a range of N distinct spectral features; and
for each spectral feature in the range,
detecting a characteristic of the test beam at each spatial area; and
storing the detected characteristic of the test beam at each of M spatial areas of the spectrometer as a column of a preliminary two-dimensional matrix, wherein the column is assigned based on the spectral feature and wherein the preliminary two-dimensional matrix captures the input-output relationship of the spectrometer; and
calculating a two-dimensional matrix based on the preliminary two-dimensional matrix;
wherein the number of rows of the two-dimensional matrix and the number of columns of the preliminary two-dimensional matrix equals N, and the number of columns of the two-dimensional matrix and the number of rows of the preliminary two-dimensional matrix equals M; and projecting the light beam onto distinct spatial areas of the spectrometer and detecting a characteristic of the projected light beam at each distinct spatial area of the spectrometer; and estimating the optical spectrum of the light beam including performing matrix multiplication between the two-dimensional matrix and the detected light beam characteristics.

12. The method of claim 11 wherein the number N of distinct spectral features determines a resolution of the estimated optical spectrum.

13. A method of estimating the optical spectrum of a light beam, the method comprising:

creating a two-dimensional matrix relating to an input-output relationship of a spectrometer by calculating a pseudoinverse of a preliminary two-dimensional matrix, wherein the preliminary two-dimensional matrix captures the input-output relationship of the spectrometer;

storing the two-dimensional matrix;

projecting the light beam onto distinct spatial areas of the spectrometer and detecting a characteristic of the projected light beam at each distinct spatial area of the spectrometer; and estimating the optical spectrum of the light beam comprising performing matrix multiplication between the stored two-dimensional matrix and the detected light beam characteristics.

14. The method of claim 13, wherein calculating the pseudoinverse of the preliminary two-dimensional matrix comprises performing a singular value decomposition on the preliminary two-dimensional matrix.

15. The method of claim 14, further comprising reducing an impact of noise by reducing the components of the matrix product for which contributions from the noise exceed contributions from the signal.

16. A metrology apparatus comprising:

a spectrometer comprising:
a spectrum dispersing device configured to separate a light beam into different filtered versions of the optical spectrum of the light beam; and
a detector defining distinct spatial areas, the detector being configured to receive a different filtered version of the optical spectrum at each spatial area and to detect a characteristic of the projected light beam at each distinct spatial area;

a test apparatus configured to create a two-dimensional matrix that represents the input-output relationship of the spectrometer in which each entry of the two-dimensional matrix provides a relationship between one or more spatial areas of the detector and each spectral feature, the test apparatus including a test beam configured to interact with the spectrometer;

a control system connected to the spectrometer and configured to:
receive detected light beam characteristics produced from a light beam that interacts with the spectrometer and is distinct from the test beam; and
estimate the optical spectrum of the light beam based on an analysis that uses the received detected light beam characteristics and the two-dimensional matrix.

17. The metrology apparatus of claim 16, wherein each spatial area is a surface made up of one or more imaging elements of the detector.

18. The metrology apparatus of claim 16, wherein the spectrum dispersing device includes an interference optical apparatus that comprises:

an etalon configured to angularly separate the light beam into the different filtered versions of the optical spectrum by producing a plurality of light beams that interfere with each other, and a lens configured to project the different filtered versions onto the distinct spatial areas of the detector;

wherein the spatial areas of the detector are arranged along a radial direction from a center region.

19. The metrology apparatus of claim 18, wherein the number of rows of the two-dimensional matrix equals N, and N equals a range of distinct spectral features that are stored in the rows of the two-dimensional matrix, wherein the range of distinct spectral features spans at least one free spectral range of the etalon and the number N of distinct spectral features determines a resolution of the estimated optical spectrum.

20. The metrology apparatus of claim 16, wherein the detector includes an array of photodiode detectors that extend along one direction.

21. The metrology apparatus of claim 16, wherein the control system includes memory configured to store the detected characteristics of the projected light beam in an array, wherein the number of rows of the array corresponds to the number of rows of distinct spatial areas of the detector in a first spatial direction and the number of columns of the array corresponds to the number of columns of distinct spatial areas of the detector in a second spatial direction.

22. The metrology apparatus of claim 21, wherein the first spatial direction is a radial direction and the second spatial direction is perpendicular to the radial direction.

23. The metrology apparatus of claim 16, wherein the test apparatus comprises:
a test light source configured to produce the test beam; and
a spectral feature actuation apparatus controlling a spectral feature of the test beam.

24. The metrology apparatus of claim 23, wherein the test light source includes a single frequency all-solid-state laser.

25. The metrology apparatus of claim 16, wherein the test beam has a bandwidth that is 5-500,000 times smaller than the bandwidth of the light beam.

26. The metrology apparatus of claim 16, further comprising memory in which the two-dimensional matrix is stored, and wherein the control system is further configured to access the two-dimensional matrix from the memory.

27. The metrology apparatus of claim 16, wherein the different filtered versions are distributions of the intensity of the light beam that have been separated by the spectrum dispersing device based on values of the spectral feature of the light beam.

28. A metrology apparatus comprising:
a spectrometer in the path of a light beam, the spectrometer comprising:
a spectrum dispersing device configured to separate the light beam into different filtered versions of the optical spectrum of the light beam; and
a detector in the path of the projected light beam and defining distinct spatial areas, the detector being configured to receive a different filtered version of the optical spectrum at each spatial area and to detect a characteristic of the projected light beam at each distinct spatial area;
a control system connected to the spectrometer and configured to:
  receive a two-dimensional matrix in which each entry of the matrix provides a relationship between one or more spatial areas and each spectral feature, wherein the two-dimensional matrix is related to the input-output relationship of the spectrometer;
  analyze the detected light beam characteristics and the received two-dimensional matrix; and
  estimate an optical spectrum of the light beam based on the analysis;
a test light source configured to produce a test beam, wherein the spectrometer interacts with the test beam; and
a spectral feature actuation apparatus configured to control a spectral feature of the test beam;

the spectral feature actuation apparatus is configured to change a spectral feature of the test beam across a range of N distinct spectral features while the test beam interacts with the spectrometer;

the detector is configured to detect a characteristic of the test beam at each spatial area; and the control system is connected to the test light source and the spectral feature actuation apparatus, and is configured to create the two-dimensional matrix by: for each spectral feature in the range, storing the detected characteristic of the test beam at each of M spatial areas of the spectrometer as a column of the preliminary two-dimensional matrix, wherein the column is assigned based on the spectral feature and wherein the preliminary two-dimensional matrix captures the input-output relationship of the spectrometer.

* * * * *